US010300998B2

(12) United States Patent
Terada

(10) Patent No.: US 10,300,998 B2
(45) Date of Patent: May 28, 2019

(54) AQUATIC JET PROPULSION DEVICE

(71) Applicant: YAMAHA HATSUDOKI KABUSHIKI KAISHA, Iwata, Shizuoka (JP)

(72) Inventor: Kohei Terada, Kennesaw, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 51 days.

(21) Appl. No.: 15/383,081

(22) Filed: Dec. 19, 2016

(65) Prior Publication Data
US 2018/0170502 A1   Jun. 21, 2018

(51) Int. Cl.
*B63H 5/15*         (2006.01)
*G05D 1/00*         (2006.01)
*B63H 11/08*        (2006.01)
*B63H 21/17*        (2006.01)
*G05D 1/02*         (2006.01)
*B63B 35/12*        (2006.01)
*B63B 35/71*        (2006.01)
*B63B 35/79*        (2006.01)
*B63H 11/00*        (2006.01)
*B63H 16/04*        (2006.01)

(52) U.S. Cl.
CPC ............... *B63H 21/17* (2013.01); *B63H 5/15* (2013.01); *B63H 11/08* (2013.01); *G05D 1/0016* (2013.01); *G05D 1/0206* (2013.01); *B63B 35/12* (2013.01); *B63B 35/71* (2013.01); *B63B 35/7943* (2013.01); *B63H 16/04* (2013.01); *B63H 2011/008* (2013.01); *B63H 2011/081* (2013.01)

(58) Field of Classification Search
None
See application file for complete search history.

(56) References Cited

U.S. PATENT DOCUMENTS

| 5,984,739 A | 11/1999 | Donahue |
| 6,000,978 A | 12/1999 | Donahue |
| 6,823,813 B2 | 11/2004 | Mazin |
| 7,207,282 B1 | 4/2007 | Ruan et al. |
| 8,011,314 B2 | 9/2011 | McGeever et al. |
| 8,567,336 B1 | 10/2013 | Mazin |
| 8,939,104 B2 | 1/2015 | Holesz |
| 2003/0167991 A1 | 9/2003 | Namanny |

(Continued)

*Primary Examiner* — Eduardo Colon Santana
*Assistant Examiner* — Said Bouziane
(74) *Attorney, Agent, or Firm* — Global IP Counselors, LLP

(57) ABSTRACT

An aquatic jet propulsion device basically includes a portable main control module, a first submersible propulsion unit and a first sub-two-way communication device. The portable main control module includes a main controller and a main two-way communication device. The first submersible propulsion unit includes a first motor, a first battery electrically connected to the first motor and a first motor controller operatively connected to the first motor to control a speed of the first motor. The first sub-two-way communication device is configured to communicate with the main two-way communication device. The main controller is programmed to output a first control signal to control the speed of the first motor of the first submersible propulsion unit via the first motor controller based on a first feedback signal containing first propulsion unit data that is received from the first sub-two-way communication device.

20 Claims, 21 Drawing Sheets

(56) References Cited

U.S. PATENT DOCUMENTS

| | | | |
|---|---|---|---|
| 2006/0102532 A1* | 5/2006 | Cadotte, Jr. | B01D 21/0027 210/94 |
| 2008/0236471 A1* | 10/2008 | Mott | B63B 35/71 114/347 |
| 2011/0174209 A1 | 7/2011 | Thiessen | |
| 2012/0126972 A1* | 5/2012 | Rott | G08B 1/08 340/539.11 |
| 2013/0059489 A1* | 3/2013 | Vlock | B63B 7/085 440/6 |
| 2016/0252906 A1* | 9/2016 | Langford-Wood | G05D 1/0088 701/21 |

\* cited by examiner

AQUATIC JET PROPULSION DEVICE

BACKGROUND

Field of the Invention

The present invention generally relates to the field of aquatic jet propulsion devices.

Background Information

Aquatic vessels (e.g., stand up paddle boards, kayaks, canoes, surfboards, boats, submersibles, etc.) are used for many purposes such as for recreation, exercise or transportation. Depending on the purpose of the aquatic vessel, a propulsion device may be provided. In some instances, the aquatic vessel is primarily designed to be used without a propulsion device such as in the cases of stand up paddle boards, kayaks, canoes and surfboards. However, even with these types of aquatic vessel that typically do not have a propulsion device, sometimes situations arise in which it is desirable to have a propulsion device. One example of an aquatic vessel with a propulsion device is disclosed in U.S. Patent Publication No. 2003/0167991 A1, which discloses a motorized surfboard.

SUMMARY

In view of the current state of the technology, it has been discovered that a need exists for an aquatic jet propulsion device that is relatively compact and lightweight so as to not interfere with the normal non-motor propelled operation of the aquatic vessel.

Generally, the present disclosure is directed to various features of an aquatic jet propulsion devices that can be used with aquatic vessels as well as can be used by a swimmer or a diver.

In accordance with one aspect of the present disclosure, an aquatic jet propulsion device is provided that basically comprises a portable main control module, a first submersible propulsion unit and a first sub-two-way communication device. The portable main control module includes a main controller and a main two-way communication device. The first submersible propulsion unit includes a first motor, a first battery electrically connected to the first motor and a first motor controller operatively connected to the first motor to control a speed of the first motor. The first sub-two-way communication device is configured to communicate with the main two-way communication device. The main controller is programmed to output a first control signal to control the speed of the first motor of the first submersible propulsion unit via the first motor controller based on a first feedback signal containing first propulsion unit data that is received from the first sub-two-way communication device.

Also other features, aspects and advantages of the disclosed aquatic jet propulsion devices will become apparent to those skilled in the field of aquatic jet propulsion device from the following detailed description, which, taken in conjunction with the annexed drawings, discloses several illustrative embodiments of an aquatic jet propulsion device with various features.

BRIEF DESCRIPTION OF THE DRAWINGS

Referring now to the attached drawings which form a part of this original disclosure.

Figure 1:
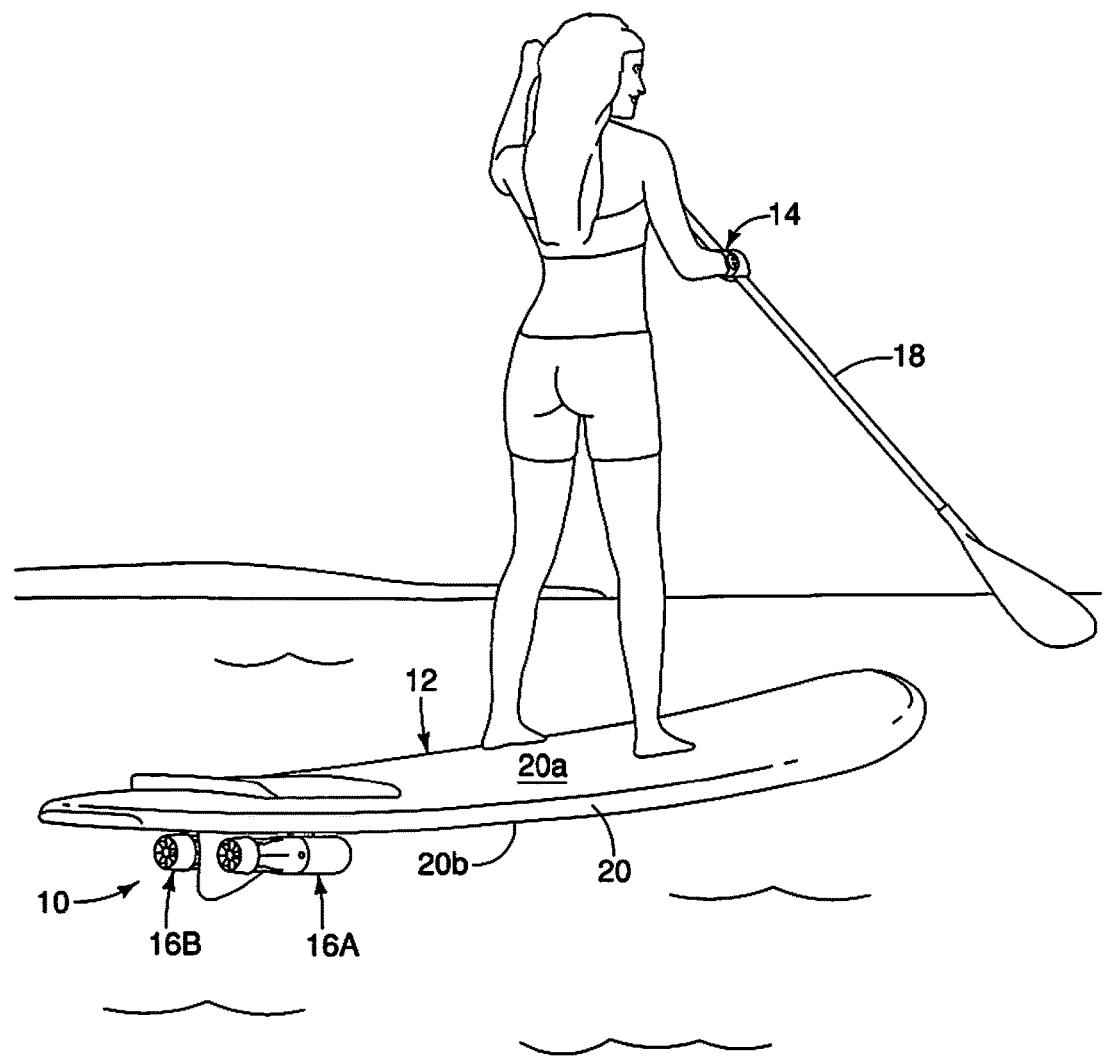
FIG. 1 is a rear perspective view of an aquatic vessel (i.e., a stand up paddle board) equipped with an aquatic jet propulsion device in accordance with a first embodiment, in which the aquatic jet propulsion device includes a portable main control module and a pair of submersible propulsion units.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, an aquatic jet propulsion device 10 is illustrated in accordance with a first embodiment. As seen in FIG. 1, the aquatic jet propulsion device 10 is installed on a stand up paddle (SUP) board 12, which is an example of an aquatic vessel. However, it will be apparent to those skilled in the art from this disclosure that the aquatic jet propulsion device 10 can be used with other types of aquatic vessels, and thus are not limited to any particular aquatic vessels. An aquatic vessel as used herein is a structure that a reasonable observer looking at the structure's physical characteristics and activities would consider it designed to a practical degree for carrying people or things over water or underwater. For example, an aquatic vessel includes personal floatation devices and scuba gear that that is designed to carrying people or things over water or underwater. Accordingly, the stand up paddle (SUP) board 12 will hereinafter be simply referred to the aquatic vessel 12.

Figure 2:
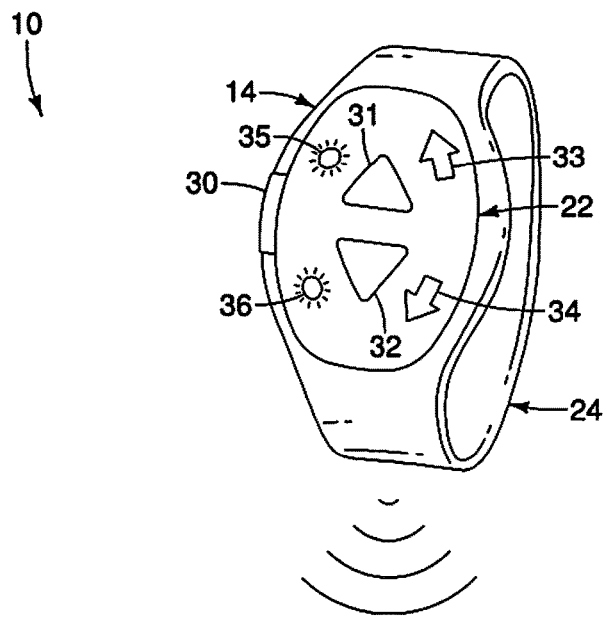
FIG. 2 is a perspective view of the aquatic jet propulsion device illustrated in FIG. 1.
Figure 2:
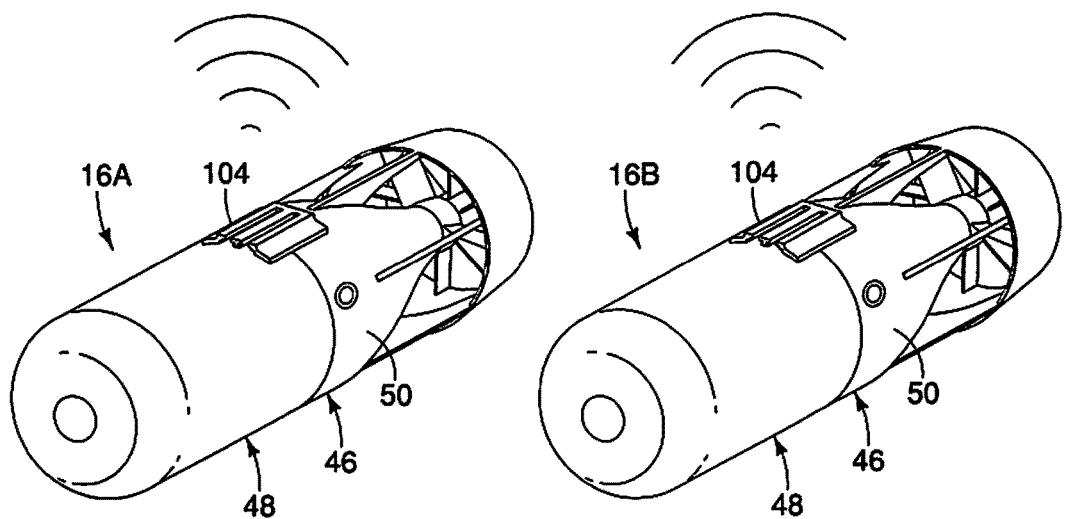

Basically, as seen in FIGS. 1 and 2, in the first embodiment, the aquatic jet propulsion device 10 comprises a portable main control module 14 and a plurality of submersible propulsion units 16A and 16B. Here, in the first embodiment, the aquatic jet propulsion device 10 includes only two of the submersible propulsion units 16A and 16B. However, it will be apparent to those skilled in the art from this disclosure that the aquatic jet propulsion device 10 can be configured with only a single one of the submersible propulsion units 16A and 16B, or more than two of the submersible propulsion units 16A and 16B, as needed and/or desired for the particular device.

Referring again to FIG. 1, in the first embodiment, the portable main control module 14 is configured as a wearable device that is configured to be worn on the wrist of the user of the aquatic vessel 12. However, the portable main control module 14 is not limited to being configured to be worn on the wrist of the user of the aquatic vessel 12. For example, the portable main control module 14 can be configured to be mounted on a paddle 18 of the aquatic vessel 12 or some other area of the user's body.

As seen in FIG. 1, the aquatic vessel 12 further comprises a floating body 20 having an above water level surface 20a and a below water level surface 20b. The submersible propulsion units 16A and 16B are attached to the below water level surface 20b. As explained hereinafter, the submersible propulsion units 16A and 16B are preferably configured to be detachable and reinstallable to the below water level surface 20b without damaging the aquatic vessel 12. Also, preferable, in the first embodiment, the aquatic jet propulsion device 10 is configured as an aftermarket add-on kit that can be attached to existing aquatic vessels. Of course, if needed and/or desired, the aquatic jet propulsion device 10 can be an integrated part of an aquatic vessel.

As illustrated in FIG. 2, the portable main control module 14 is configured to carry out two-way wireless communications with each of the submersible propulsion units 16A and 16B. However, it will be apparent to those skilled in the art from this disclosure that the portable main control module 14 can be interconnected to the submersible propulsion units 16A and 16B by wires for carrying out two-way communications therebetween if needed and/or desired. Here, in the first embodiment, the aquatic jet propulsion device 10 uses Bluetooth® communications to wirelessly send signals between the portable main control module 14 and each of the submersible propulsion units 16A and 16B. However, it will be apparent to those skilled in the art from this disclosure that the two-way wireless communications can be carried out using other wireless technology as needed and/or desired.

Figures 3, 4:
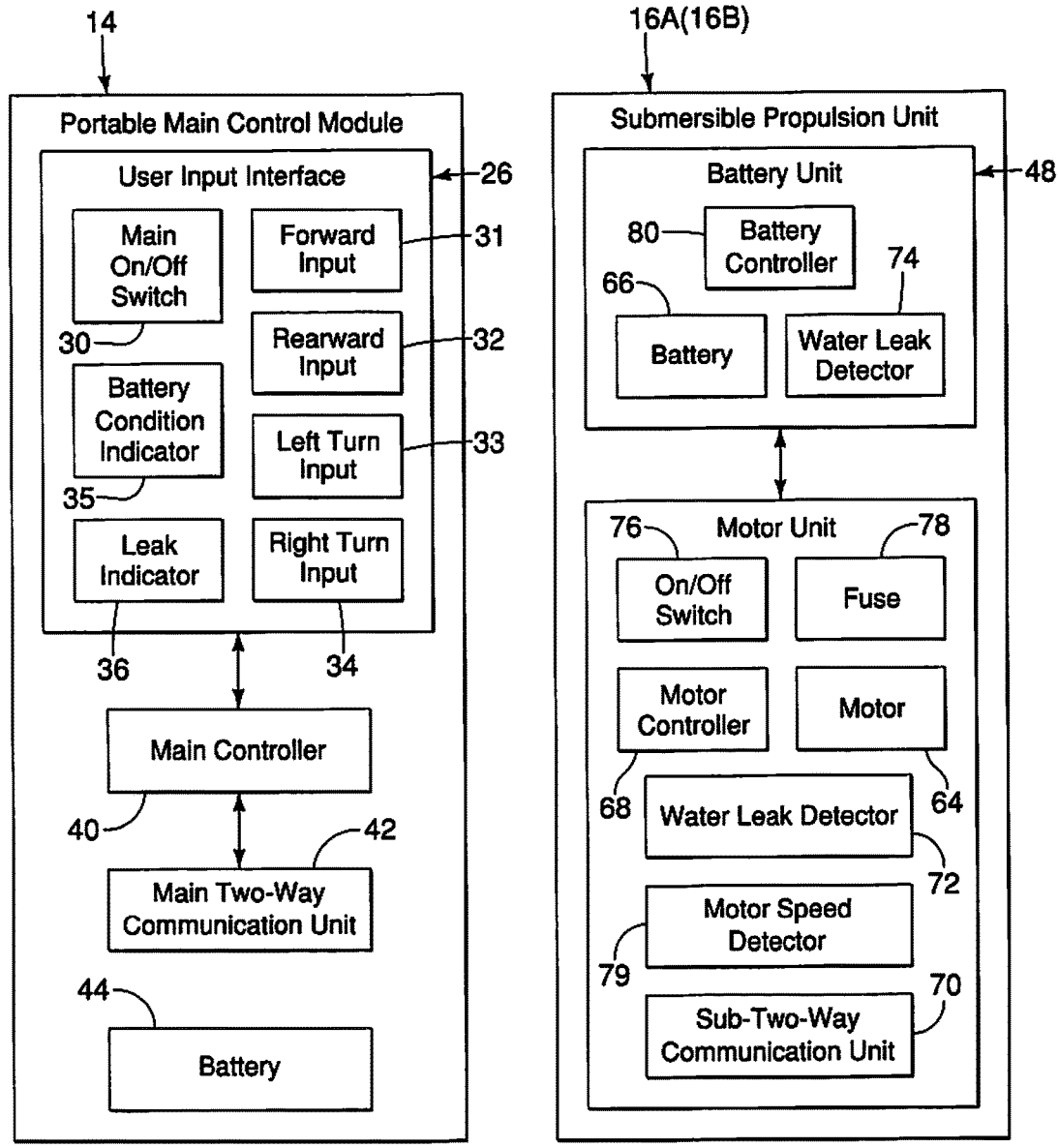
FIG. 3 is a block diagram of the portable main control module of the aquatic jet propulsion device illustrated in FIGS. 1 and 2.
FIG. 4 is a block diagram of one of the submersible propulsion units of the aquatic jet propulsion device illustrated in FIGS. 1 and 2.
Figure 5:
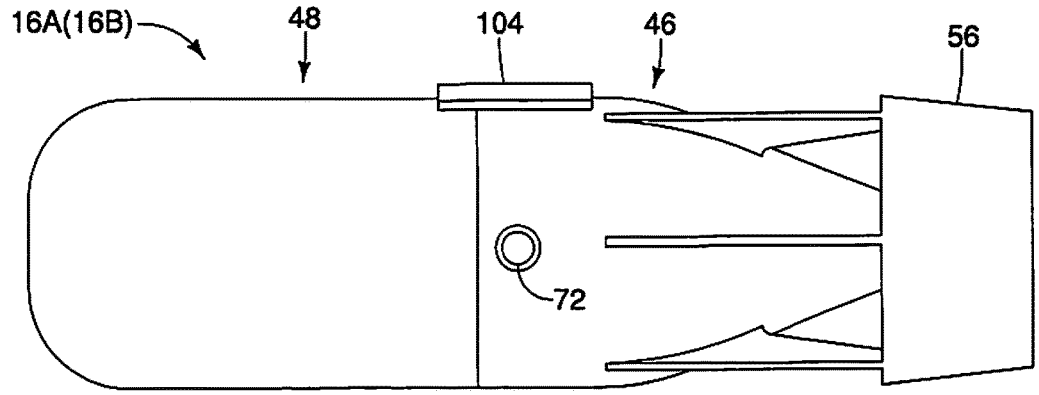
FIG. 5 is a side elevational view of one of the submersible propulsion units of the aquatic jet propulsion device illustrated in FIGS. 1 and 2.
Figure 6:
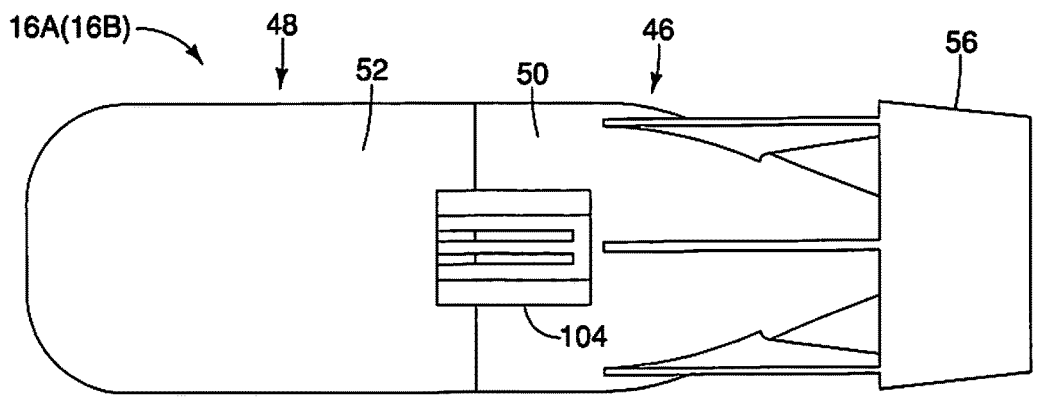
FIG. 6 is a top plan view of the submersible propulsion unit illustrated in FIG. 5.
Figure 7:
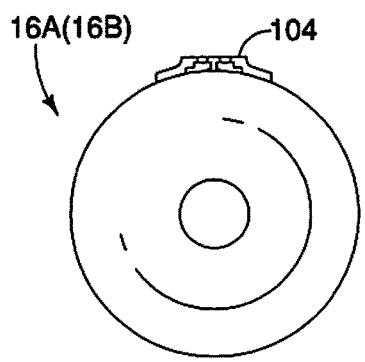
FIG. 7 is a front end elevational view of the submersible propulsion unit illustrated in FIGS. 5 and 6.
Figure 8:
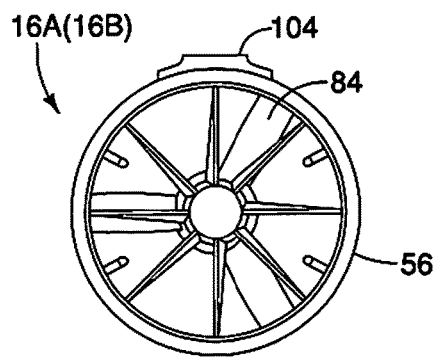
FIG. 8 is a rear end elevational view of the submersible propulsion unit illustrated in FIGS. 5 to 7.
Figure 9:
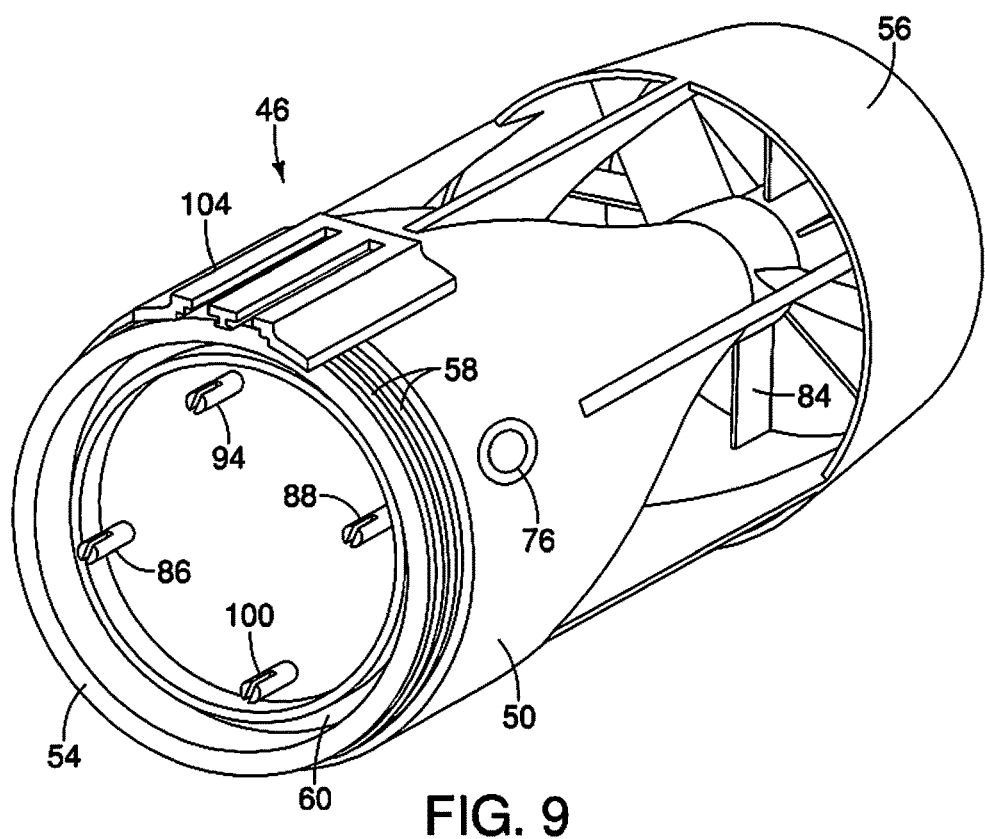
FIG. 9 is a perspective view of the motor unit of the submersible propulsion unit illustrated in FIGS. 5 to 8 with the battery unit detached from the motor unit.
Figure 10:
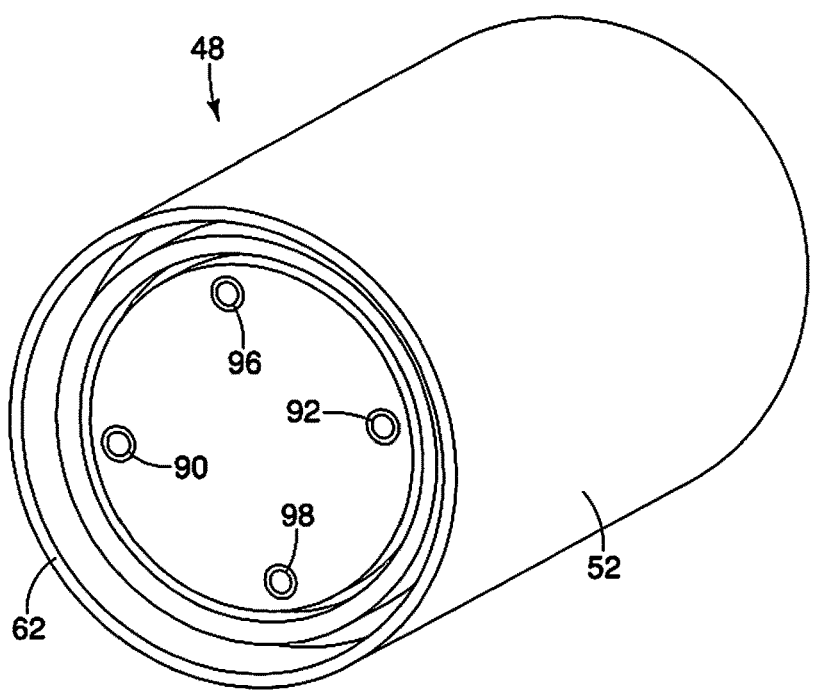
FIG. 10 is a perspective view of the battery unit of the submersible propulsion unit illustrated in FIGS. 5 to 8 with the motor unit detached from the battery unit.

Referring now to FIGS. 2 and 3, in the first embodiment, the portable main control module 14 will now be discussed in more detail. As seen in FIG. 2, the portable main control module 14 includes a control module housing 22 and a mounting strap 24. The control module housing 22 is a watertight housing that houses the various components that are diagrammatically illustrated in FIG. 3. The mounting strap 24 is molded onto the control module housing 22. The mounting strap 24 is an elastic strap that is designed to be placed on the user's wrist, or can be dimensioned to be installed on the paddle 18 or other parts of the aquatic vessel 12. However, it will be apparent to those skilled in the art from this disclosure that the control module housing 22 can be supported on the user or other parts of an aquatic vessel as needed and/or desired.

As seen in FIGS. 2 and 3, the portable main control module 14 includes a user input interface 26. Here, the user input interface 26 includes push buttons that are exposed through the control module housing 22. Alternatively, the push buttons of the user input interface 26 can be replaces with any combination of input devices that include, but not limited to, push buttons, knobs, wheels, touch screens, etc. In the first embodiment, the user input interface 26 includes a main on-off switch 30, a forward input 31 (i.e., a first speed control input), a rearward input 32 (i.e., a second speed control input), a left turn input 33, a right turn input 34, a battery condition indicator 35 and a leak indicator 36. The user input interface 26 can include other types of inputs as needed and/or desired. For example, the user input interface 26 can be provided with a separate pairing switch that could be provided on a rear face of the control module housing 22.

The main on-off switch 30 is a button-type switch that turns on and off the various components of the portable main control module 14 in a conventional manner. The main on-off switch 30 constitutes an activation switch configured to activate the portable main control module 14. Here, the main on-off switch 30 is on a side edge of the control module housing 22 that is separate from the other inputs for easy operation and for avoiding accident operation. The forward input 31 and the rearward input 32 are button-type switches that are located on a front face of the control module housing 22. The forward input 31 and the rearward input 32 are used to simultaneously control the output speeds and the thrust directions of both of the submersible propulsion units 16A and 16B. For example, each of the forward input 31 and the rearward input 32 can be pressed to switch sequentially between four speeds (e.g., a stop setting, an eco or low speed setting, a standard or medium speed setting, and a high speed setting). The left turn input 33 and the right turn input 34 are also button-type switches that are located on a front face of the control module housing 22. By pressing one of the left turn input 33 and the right turn input 34, the thrust direction on one of the submersible propulsion units 16A and 16B is reversed with respect to the other of the submersible propulsion units 16A and 16B to perform a turn in the desired direction.

The battery condition indicator 35 and the leak indicator 36 are light indicators such as LED. The case of the battery condition indicator 35 can be configured to emit different colors of light depending on the battery status of the submersible propulsion units 16A and 16B. For example, the battery condition indicator 35 can be configured to emit green light when the battery capacity of both of the submersible propulsion units 16A and 16B is above a first prescribed battery capacity threshold. The battery condition indicator 35 can be configured to emit yellow or amber light when the battery capacity of at least one of the submersible propulsion units 16A and 16B is below the first prescribed battery capacity threshold. The battery condition indicator 35 can be configured to emit red light when the battery capacity of at least one of the submersible propulsion units 16A and 16B is below a second battery capacity threshold that corresponds to a preset minimum operating battery capacity. On the other hand, the leak indicator 36 can normally be unlit, and then configured to emit red light when a water leak is detected in one of the submersible propulsion units 16A and 16B.

As seen in FIG. 3, the portable main control module 14 further includes a main controller 40 and a main two-way communication device 42. Basically, the main controller 40 receives user inputs via the user input interface 26 and outputs control signals to the two-way communication device 42 that in turn transmits the control signals to the submersible propulsion units 16A and 16B. In addition, the main controller 40 receives propulsion unit data from each of the submersible propulsion units 16A and 16B via the two-way communication device 42. In response to the user inputs via the user input interface 26 and the propulsion unit data from each of the submersible propulsion units 16A and 16B, the main controller 40 controls the operation of the submersible propulsion units 16A and 16B in a manner intended by that user. Also, the main controller 40 preferably outputs propulsion unit status data to the user input interface 26 for informing the user of the condition of the submersible propulsion units 16A and 16B such as outputting battery condition data to the battery condition indicator 35 and a water leak detection to the leak indicator 36.

The main controller 40 basically has at least one processor with at least one control program (e.g., the control program diagrammatically illustrated in FIGS. 14 to 16) that controls the operations of the submersible propulsion units 16A and 16B as discussed below. More preferably, the main controller 40 is a microcomputer that in addition to the at least one processor further includes other conventional components such as an input interface circuit, an output interface circuit, and storage devices, such as a ROM (Read Only Memory) device and a RAM (Random Access Memory) device, flash memory, etc. The storage devices store processing results, operation and condition data received from the submersible propulsion units 16A and 16B and control programs that are run by the at least one processor of the main controller 40. For example, the internal RAM of the main controller 40 stores statuses of operational flags and various input operations from the user input interface 26, and condition data received from the submersible propulsion units 16A and 16B. The internal ROM of the main controller 40 stores the information and programs for various operations. It will be apparent to those skilled in the art from this disclosure that the precise structure and algorithms for the main controller 40 can be any combination of hardware and software that will carry out the functions of the aquatic jet propulsion device 10 as described herein.

In the first embodiment, the main two-way communication device 42 is a main two-way wireless communication device. For example, the main two-way communication device 42 can be a Bluetooth® radio transceiver that includes both transmitter and receiver functions and that has an integrated antenna. One example of Bluetooth® radio transceiver is an Ericsson PBA 313, 2.4-2.5 GHz Bluetooth® radio transceiver for Bluetooth communication links. Other suitable wireless transceivers and/or wireless personal area networks are contemplated. For example, an Atmel AT86RF231, 2.4 GHz transceiver utilizing AES encryption and DSS spread spectrum technology supporting 16 channels and the IEEE 802.15.4 communication protocol. Moreover, the transmitter and the receiver can be separate circuits in the main two-way communication device 42. Thus, it will be noted that the term "two-way communication device" as used herein includes a transceiver, a transmitter-receiver (the transmitter and the receiver are separate circuits), or a radio, and contemplates any device or devices, separate or combined, capable of transmitting and receiving signals, including control signals, command signals or other signals related to some function of the component being controlled. Also, the term "two-way communication device" as used herein includes both wirelessly communication and wired communication unless otherwise specified.

As seen in FIG. 3, the portable main control module 14 further includes a power source or battery 44 that supplies electrical energy to the components of the portable main control module 14. The battery 44 can be one or more coin type batteries, such as lithium coin cell batteries or similar batteries. The battery 44 can be either a rechargeable battery or a disposable battery. Moreover, the battery 44 can be substituted with other suitable power sources that can supply electrical energy to the components of the portable main control module 14.

Referring now to FIGS. 2 and 4 to 11, the submersible propulsion units 16A and 16B will now be discussed in more detail. The submersible propulsion units 16A and 16B are identical. Thus, the parts of the submersible propulsion units 16A and 16B will be given the same reference symbols for the sake of brevity. Of course, the submersible propulsion units 16A and 16B can be different as needed and/or desired for an application.

As seen in FIGS. 2 and 5 to 9, each of the submersible propulsion units 16A and 16B basically includes a motor unit 46 and a battery unit 48. In each of the submersible propulsion units 16A and 16B, the motor unit 46 has a motor housing 50 and the battery unit 48 has a battery housing 52. Each of the motor housings 50 and each of the battery housings 52 for the submersible propulsion units 16A and 16B are individually watertight. The motor housing 50 and the battery housing 52 are preferably made of a lightweight non-metallic material and/or corrosion resistant alloys such as aluminum, stainless steel, etc.

Preferably, the battery housing 52 is detachably and reattachably attached to the motor housing 50. Here, in the first embodiment, the battery housing 52 is friction-fitted onto the motor housing 50. In this way, the battery unit 48 is detachable from and reinstallable to the motor unit 46 without damaging either the motor unit 46 and the battery unit 48 as in the first embodiment. In this way, the battery unit 48 can be separated from the motor unit 46 and placed on a battery charger (not shown), and then, the battery unit 48 can be reattached to the motor unit 46 after being recharged. Alternatively, if the battery unit 48 is provided with a pluggable power inlet, then the motor unit 46 and the battery unit 48 can be an integrated unit that is non-separable.

Figure 11:
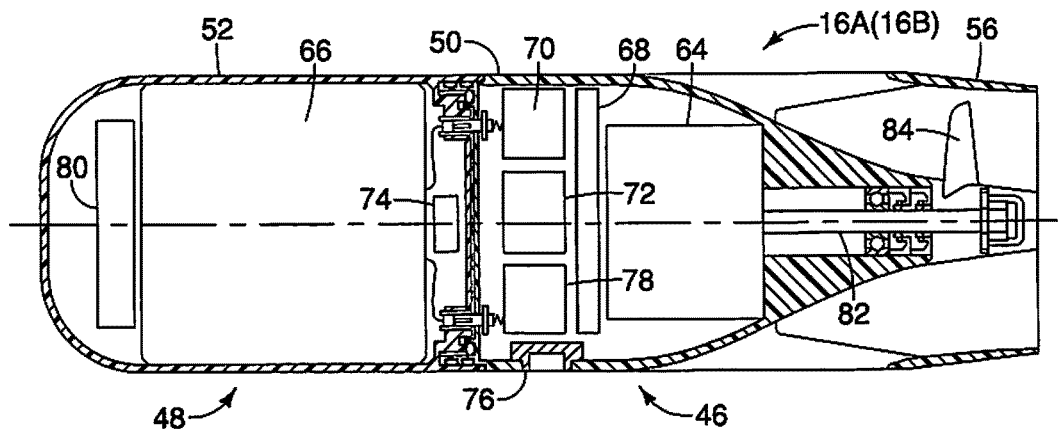
FIG. 11 is a longitudinal cross sectional view of the motor unit and the battery unit of the submersible propulsion unit illustrated in FIGS. 5 to 8.
Figure 12:
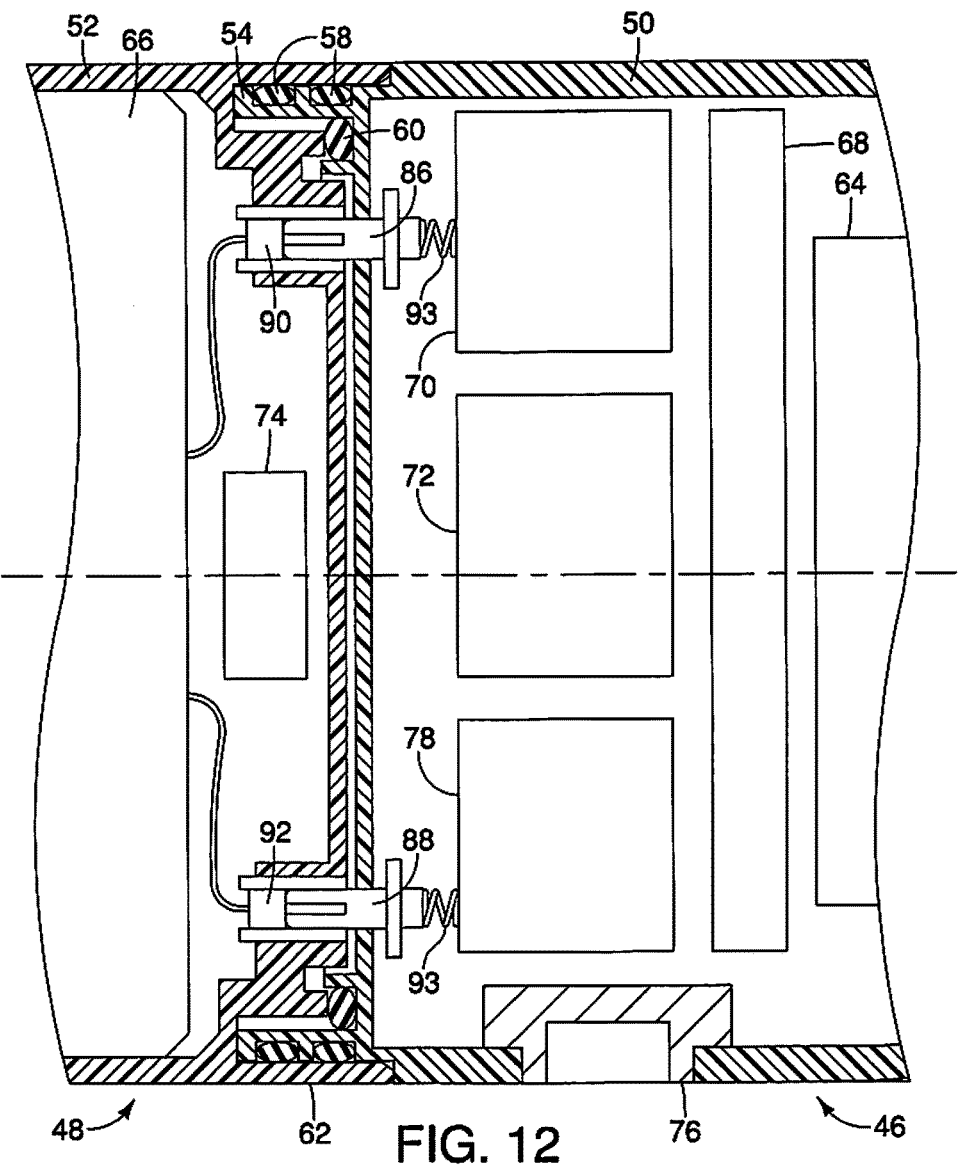
FIG. 12 is an enlarged longitudinal cross sectional view of a portion of the motor unit and the battery unit of the submersible propulsion unit illustrated in FIG. 11.

In the first embodiment, the motor housing 50 includes an annular connection flange or collar 54 at one end and a propeller shroud 56 at the other end. As seen in FIGS. 11 and 12, the annular connection collar 54 has a pair of outer seals 58 disposed on an outer peripheral surface of the annular connection collar 54 and an inner seal 60 disposed on an inner peripheral surface of the annular connection collar 54. The seals 58 and 60 are resilient, elastomeric O-rings that contact the battery housing 52 to create a watertight seal at a connection interface of the motor housing 50 and the battery housing 52. The seals 58 also aid in retaining the motor housing 50 and the battery housing 52 together.

As seen in FIGS. 11 and 12, the battery housing 52 has an annular connection collar 62 that is configured to mate with the annular connection collar 54 of the motor housing 50. In particular, the annular connection collar 62 is dimensioned to be slightly larger than the outer diameter of the annular connection collar 54 of the motor housing 50. When the annular connection collar 62 of the battery housing 52 is inserted onto the annular connection collar 54 of the motor housing 50, the seals 58 and 60 are compressed to form a watertight seal at a connection interface of the motor housing 50 and the battery housing 52.

As seen in FIG. 4, each of the submersible propulsion units 16A and 16B basically includes a motor 64, a battery 66 and a motor controller 68. In the first embodiment, each of the submersible propulsion units 16A and 16B further includes a sub-two-way communication device 70. Here, the motor housing 50 contains the motor 64, the motor controller 68 and the sub-two-way communication device 70, while the battery housing 52 includes the battery 66.

Also, preferably, in the first embodiment, each of the submersible propulsion units 16A and 16B further includes a pair of water leak detectors 72 and 74. The water leak detector 72 is provided inside of the motor housing 50 to detect water entering the motor housing 50, while the water leak detector 74 is provided inside of the battery housing 52 to detect water entering the battery housing 52. The main controller 40 is programmed to stop both of the motors 64 of the first and second submersible propulsion units 16A and 16B upon receiving a leak detection signal from one of the water leak detectors 72 and 74.

Also, the motor unit 46 of each of the submersible propulsion units 16A and 16B further includes an on-off switch 76 and a fuse 78. The on-off switch 76 is electrically connected between the battery 66 and the motor controller 68 for selectively turning the motor 64, the motor controller 68 and the sub-two-way communication device 70 on and off. The fuse 78 is disposed in the electrical circuit between the motor 64 and the battery 66. The fuse 78 is configured to disrupt the electrical circuit between the motor 64 and the battery 66 in the event of an overcurrent or overvoltage.

In the first embodiment, the motor unit 46 of each of the submersible propulsion units 16A and 16B further includes a motor speed detector 79 that is electrical connected to the motor controller 68. The motor speed detector 79 is configured and arranged to detect the rotational speed (rpms) of the motor 64 and provide a current actual rotational speed (rpms) of the motor 64 to the motor controller 68. The motor speed detector 79 can be any conventional motor speed detector that is known or developed in the future. For example, the motor speed detector 79 can be an optical motor speed detector that commonly includes a light emitting diode that provides the illumination, and a phototransistor that senses the presence or absence of that illumination. Alternatively, the motor speed detector 79 can be a magnetic motor speed detector that commonly includes a magnetic that produces a magnetic field and a magnetic encoder that senses the presence or absence of that magnetic field.

However, the rotational speed of the motor 64 can be calculated based on the voltage of the motor 64 if needed and/or desired.

Optionally, the battery unit 48 each of the submersible propulsion units 16A and 16B further includes a battery controller 80 that monitors the battery condition of the battery 66. The battery controller 80 provides battery condition data of the battery 66 to the motor controller 68 and a battery charger (not shown). The battery controller 80 basically has at least one processor with at least one battery monitoring program. More preferably, the battery controller 80 is a microcomputer that in addition to the at least one processor further includes other conventional components such as an input interface circuit, an output interface circuit, and storage devices, such as a ROM (Read Only Memory) device and a RAM (Random Access Memory) device, flash memory, etc. The storage devices store batter condition data condition data and battery monitoring program that is run by the at least one processor of the battery controller 80.

The motor 64 is preferably an electric reversible motor. For example, the motor 64 is preferably a 120 watt DC brushless motor that is configured to rotate at 3000 rpms to 3200 rpms. Preferably, the motor 64 is configured to produce a thrust of nine to ten pounds of force (i.e., eighteen to twenty pounds of force for two motors). The motor 64 is a direct drive motor that has an output shaft 82 with a propeller 84 fixedly mounted to the output shaft 82. The propeller 84 is located inside the propeller shroud 56 to form a ducted propeller, which is also known as a Kort nozzle. Here, the propeller 84 has three blades.

The battery 66 is electrically connected to the motor 64, the motor controller 68 and the sub-two-way communication device 70 for supplying electrical power thereto. The battery 66 is preferably a rechargeable Lithium Ion Battery or any other suitable electrical power supply. The battery 66 preferably has a 21.6 volt battery with a 100 Wh capacity. With this battery configuration and the abovementioned motor configuration, each of the submersible propulsion units 16A and 16B should be capable of at least about thirty minutes of runtime at the maximum speed of 3200 rpms.

As seen in FIGS. 9 to 12, the motor 64 has a pair of first electrical contacts 86 and 88 (e.g., a pair of male electrical connectors), while the battery 66 has a pair of second electrical contacts 90 and 92 (e.g., a pair of female electrical connectors). The first electrical contacts 86 and 88 mate with the second electrical contacts 90 and 92 for supplying electrical power from the battery 66 to the motor 64 when the motor unit 46 and the battery unit 48 are coupled together. In this way, the battery 66 is electrically connected to the motor 64.

To ensure good contact between the first electrical contacts 86 and 88 and the second electrical contacts 90 and 92, optionally, the first and second electrical contacts 86, 88, 90 and 92 can be configured to be pressed against each other, respectively, while the motor housing 50 and the battery housing 52 are joined. This pressing contact between the first electrical contacts 86 and 88 and the second electrical contacts 90 and 92 can be accomplished by spring loading the first electrical contacts 86 and 88 and/or spring loading the second electrical contacts 90 and 92 spring loaded. In the first embodiment, the first electrical contacts 86 and 88 are diagrammatically illustrated as being spring loaded with compression springs 93 as seen in FIG. 12. Alternatively, the first and second electrical contacts 86, 88, 90 and 92 can be configured to be pressed against each other, respectively, without using springs. For example, the motor housing 50 and the battery housing 52 can be configured such that plastic tension resulting from the connection of the motor housing 50 and the battery housing 52 can produce a biasing force that presses the first electrical contacts 86 and 88 and the second electrical contacts 90 and 92 together.

Also preferably, the motor 64 has a first communication electrical connector 94, while the battery 66 has a second communication electrical connector 96. The first communication electrical connector 94 mates with the second electrical contacts 96 for supplying battery condition data (e.g., current voltage) from the battery 66 to the motor 64 when the motor unit 46 and the battery unit 48 are coupled together. Also preferably, the battery 66 is provided with a charging connector 98 for connecting a battery charger (not shown). The motor unit 46 is provided with a dummy connector 100 that mates with the charging connector 98 when the motor unit 46 and the battery unit 48 are coupled together.

Here, the motor controller 68 in each of the submersible propulsion units 16A and 16B is depicted as a single unit or circuit board. However, the motor controller 68 can be constructed as two or more separate circuit boards that each has its own processor, if needed and/or desired. In any case, the motor controller 68 basically has at least one processor with at least one motor control program that controls the operations of the motor 64 in the corresponding one of the submersible propulsion units 16A and 16B. More preferably, the motor controller 68 in each of the submersible propulsion units 16A and 16B is a microcomputer that in addition to the at least one processor further includes other conventional components such as an input interface circuit, an output interface circuit, and storage devices, such as a ROM (Read Only Memory) device and a RAM (Random Access Memory) device, flash memory, etc. The storage devices store processing results, motor condition data of the motor 64.

The motor controller 68 is operatively connected to the sub-two-way communication device 70 to receive control signals or commands from the main controller 40 that are transmitted via the main two-way communication device 42 to the sub-two-way communication device 70. The motor controller 68 is also operatively connected to the motor 64 to control the speed of the motor 64 based on the control signals or commands received from the main controller 40. As result, the motor controller 68 is configured to control the speed of the motor 64.

Also, the motor controller 68 receives operation and/or condition data from the motor 64, the water leak detectors 72 and 74, the motor speed detector 79 and the battery controller 80. The operation and/or condition data received by the motor controller 68 is sent to the main controller 40 via wireless communication between the main two-way communication device 42 and the sub-two-way communication device 70. While the main two-way communication device 42 and the sub-two-way communication devices 70 are wireless two-way communication devices, the portable main control module 14 and the submersible propulsion units 16A and 16B can be communicate using wires if needed and/or desired. In any case, the sub-two-way communication devices 70 are configured to communicate with the main two-way communication device 42 such that two-way communication is conducted.

In the first embodiment, as just mention, each of the sub-two-way communication devices 70 is a sub-two-way wireless communication device. Each of the sub-two-way communication devices 70 can be the same as the main two-way communication device 42, which is discussed above. For example, the main two-way communication device 42 can be a Bluetooth® radio transceiver that includes both transmitter and receiver functions and that has an integrated antenna. In any case, the sub-two-way communication devices 70 are configured to conduct two-way communications with the main two-way communication device 42. The sub-two-way communication device 70 is programmed to transmit both battery condition data (e.g., voltage, current, battery capacity and battery temperature) and motor condition data (e.g., actual output shaft rpm and motor temperature) as the propulsion unit data to the main two-way communication device 42. The main controller 40 is programmed to output control signals to control the speeds of the motors 64 of the submersible propulsion unit 16A and 16B via the motor controllers 68 based on feedback signals containing propulsion unit data that is received from the first sub-two-way communication device 70. In this way, the main controller 40 is programmed to independently control the speeds of the first and second motors 64 of the first and second submersible propulsion units 16A and 16B so as to ensure that the aquatic vessel moves along a straight path.

Figure 13:
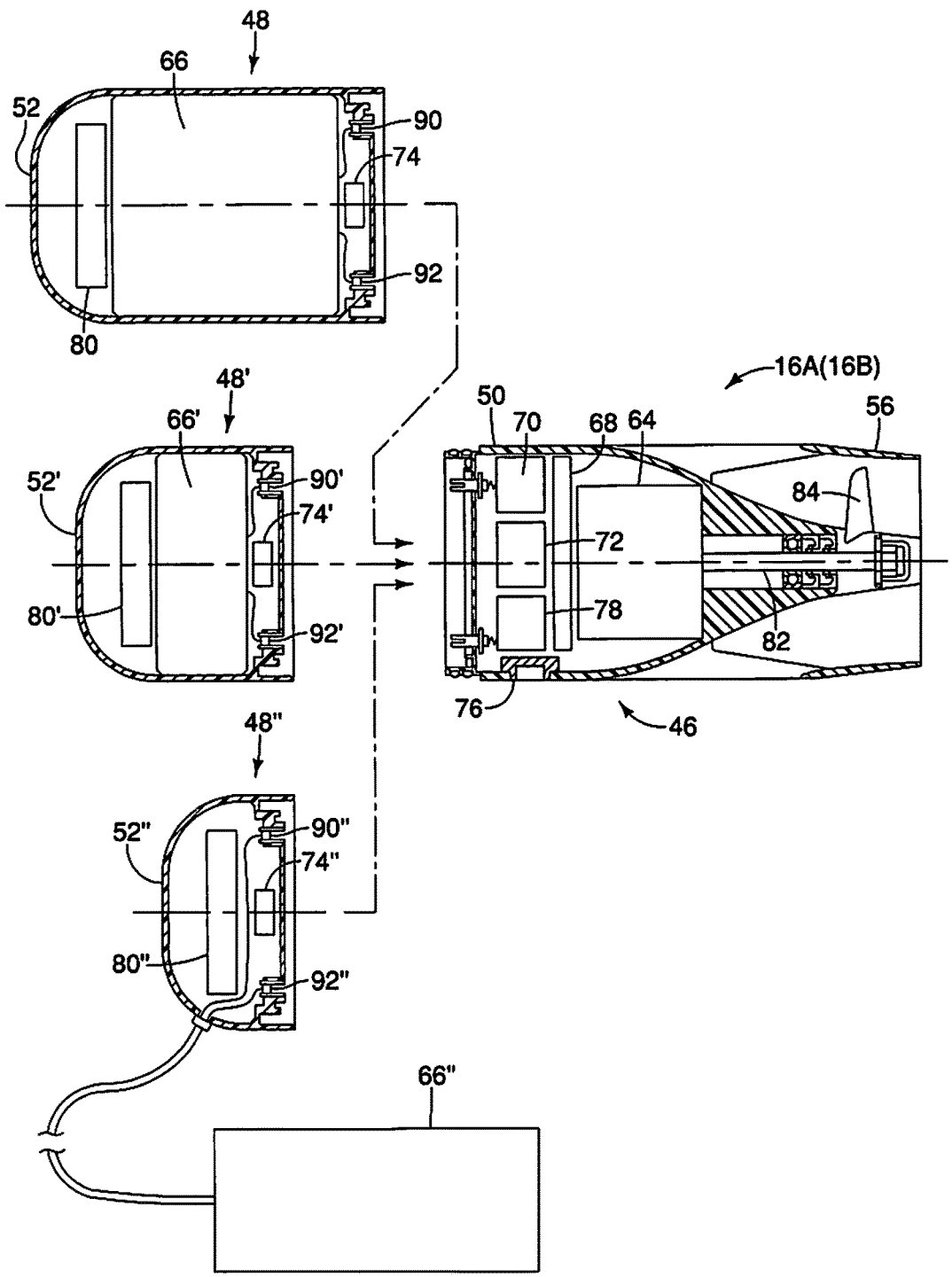
FIG. 13 is a longitudinal cross sectional view of the motor unit of the submersible propulsion unit illustrated in FIGS. 5 to 8 and several battery units that can be selectively attached to the motor unit.

As seen in FIG. 13, each of the submersible propulsion units 16A and 16B can be provided with an additional battery unit 48' having an additional battery housing 52' that houses an additional battery 66', a water leak detector 74' and an additional battery controller 80'. The additional battery housing 52' is configured to be attached in place of the battery housing 52 in each of the submersible propulsion units 16A and 16B. The additional battery 66' has a different storage capacity from the battery 66. While the additional battery 66' is illustrated as being smaller with a lower storage capacity than the battery 66, the additional battery 66' can be larger with a larger storage capacity than the battery 66 as needed and/or desired. Typically, as the storage capacity of the battery becomes smaller, the battery unit becomes lighter. In this way, the user can whether to use a heavier battery that will provide a longer runtime for the motor 64 based on the storage capacity of the battery, or a lighter battery that will provide a longer runtime for the motor 64 based on the storage capacity of the battery.

Alternatively, the each of the submersible propulsion units 16A and 16B can be provided with an additional battery unit 48" that has an additional battery housing 52" with an external battery 66" that plugs into an electrical connector provided on the additional battery housing 52". The additional battery housing 52" is configured to be attached in place of the battery housing 52 in each of the submersible propulsion units 16A and 16B. Here, similar to the other batteries 66 and 66', the additional battery housing 52" houses a water leak detector 74" and an additional battery controller 80". When using the additional battery unit 48", the external battery 66" can be mounted on the above water level surface 20 of the floating body 20. In this way, the external battery 66" can be made larger with a larger storage capacity than an internal battery such as the battery 66.

Figure 14:
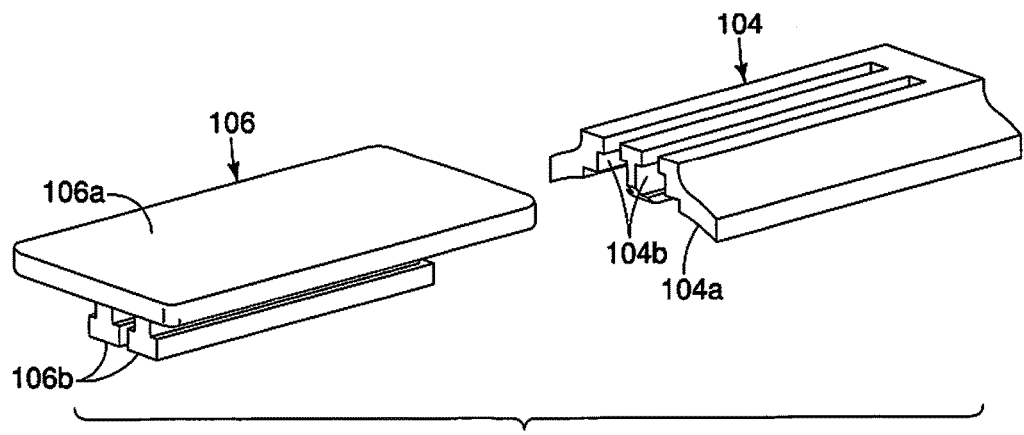
FIG. 14 is an exploded perspective view of a pair of mounting members used for attaching each of the submersible propulsion units to an aquatic vessel such as the stand up paddle board illustrated in FIG. 1.
Figure 15:
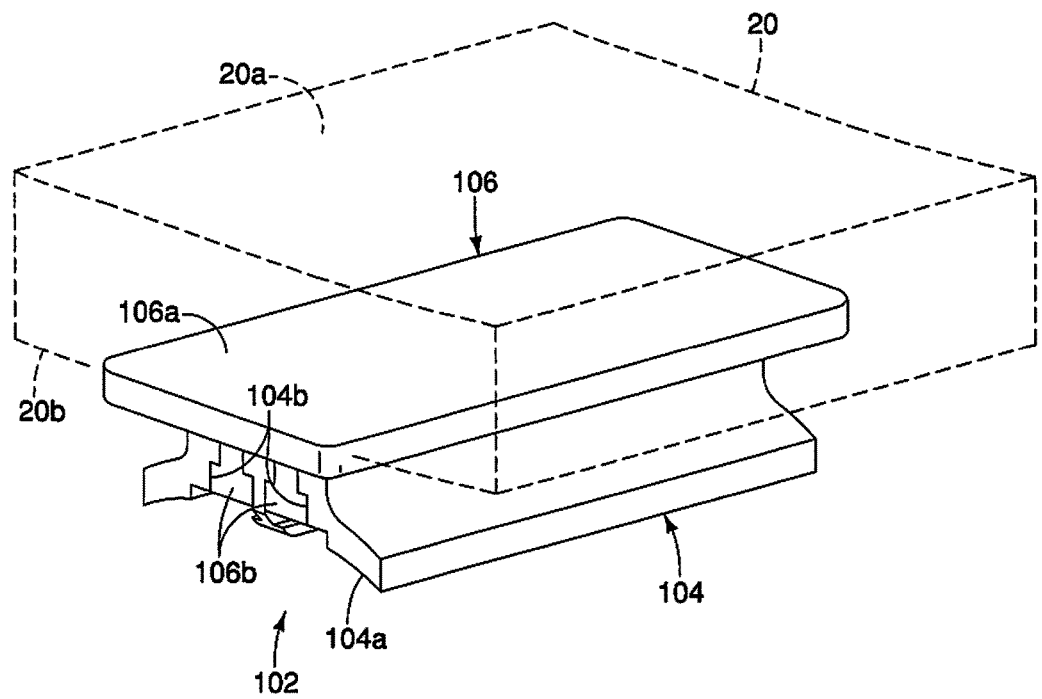
FIG. 15 is an assembled perspective view of the mounting members illustrated in FIG. 14 with a portion of the aquatic vessel shown in broken lines.

Referring now to FIGS. 14 and 15, one example of a mounting bracket 102 is illustrated that is used for mounting each of the submersible propulsion units 16A and 16B to the aquatic vessel 12. Of course, the submersible propulsion units 16A and 16B can be attached to the aquatic vessel 12 with other types of mounting arrangements. However, preferably, the submersible propulsion units 16A and 16B are attached to the aquatic vessel 12 in such a manner that the submersible propulsion units 16A and 16B can be easily detached from and reinstalled onto the aquatic vessel 12.

Here, the mounting bracket 102 includes a first attachment part 104 and a second attachment part 106. The first attachment part 104 is fixedly attached to the motor housing 50, while the second attachment part B2 is fixedly attached to the below water level surface 20b of the floating body 20 of the aquatic vessel 12. In the first embodiment, the first attachment part 104 has a curved mounting surface 104b that is fixedly attached to the motor housing 50 by an adhesive or any other suitable fastening means, such as threaded fasteners. In the first embodiment, the second attachment part 106 has a flat mounting surface 106b that is fixedly attached to the below water level surface 20b of the floating body 20 by an adhesive or any other suitable fastening means, such as threaded fasteners.

While the mounting surface 106b of the second attachment part 106 is flat in the first embodiment, it will be apparent from this disclosure that the mounting surface 106b of the second attachment part 106 can be contoured to match a surface of the aquatic vessel where one of the submersible propulsion units 16A and 16B is to be mounted. In fact, several second attachment parts with differently shaped mounting surfaces can be provided with each of the submersible propulsion units 16A and 16B so that the submersible propulsion units 16A and 16B can be mounted to various types of aquatic vessels.

The first and second attachment parts 104 and 106 are detachably connected using an interlocking tongue and groove connection. In particular, the first attachment part 104 has a pair of grooves 104b, while the second attachment part 106 has a pair of T-shaped ribs 106b. The grooves 104b are closed at the rearward end and open at the forward end so that the ribs 106b can slide into the grooves 104b to secure the second attachment part 106 to the first attachment part 104. The ribs 106b are configured to snugly fit into the grooves 104b such that the first and second attachment parts 104 and 106 are held together by friction.

Figure 16:
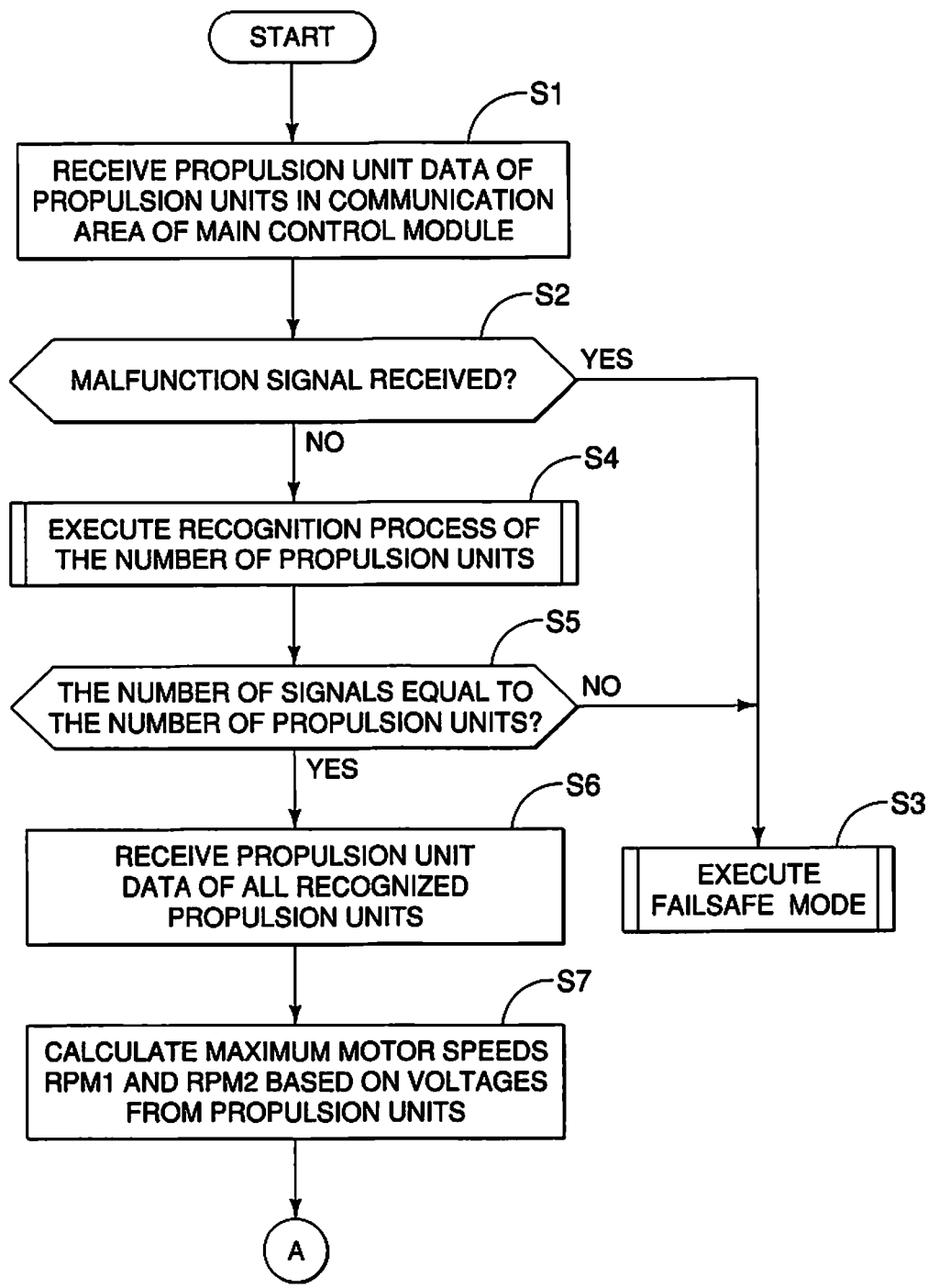
FIG. 16 is a first portion of a flow chart executed by a main controller of the portable main control module illustrated in FIGS. 1 to 3.
Figure 17:
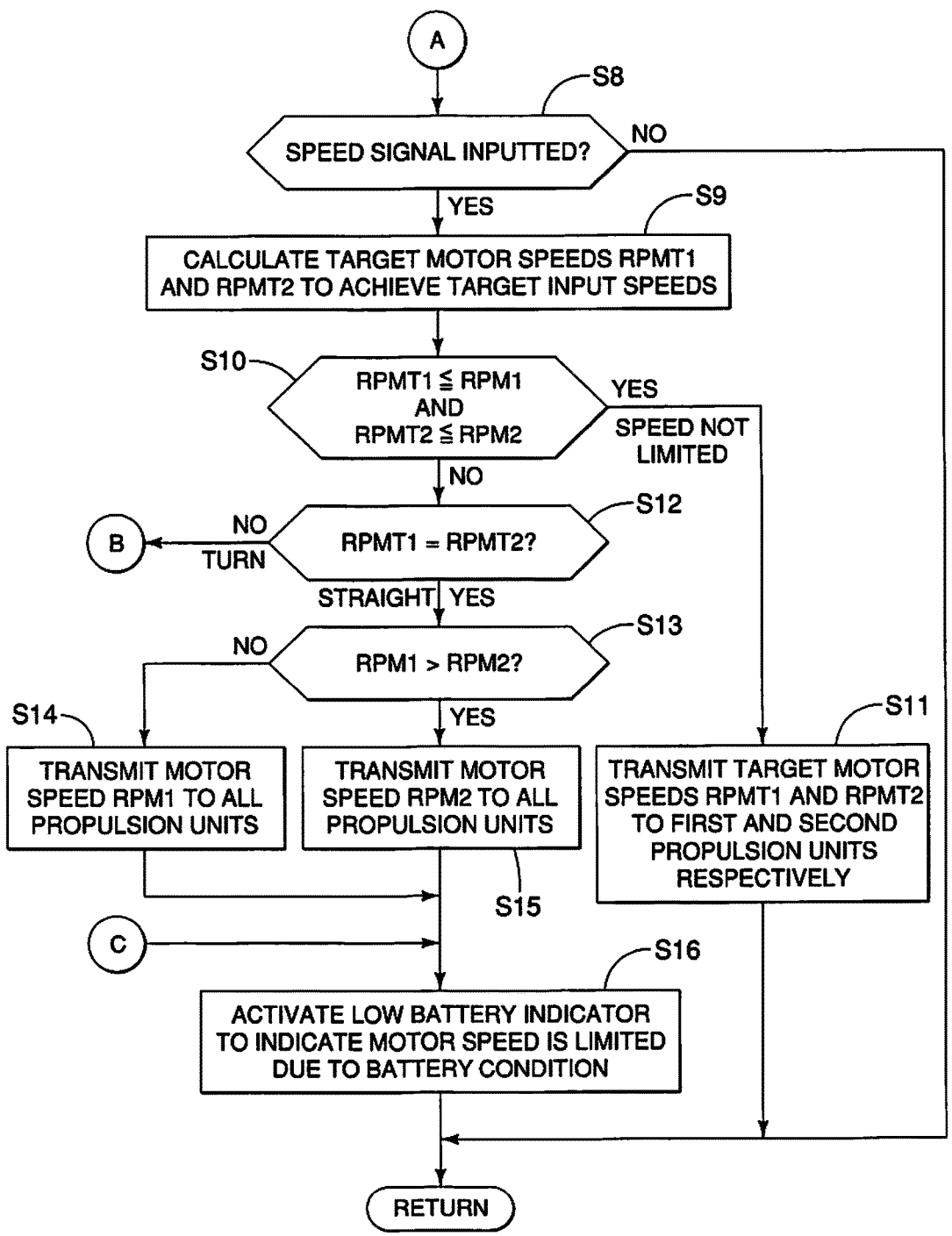
FIG. 17 is a second portion of the flow chart illustrated in FIG. 16, which is executed by a main controller of the portable main control module illustrated in FIGS. 1 to 3.
Figure 18:
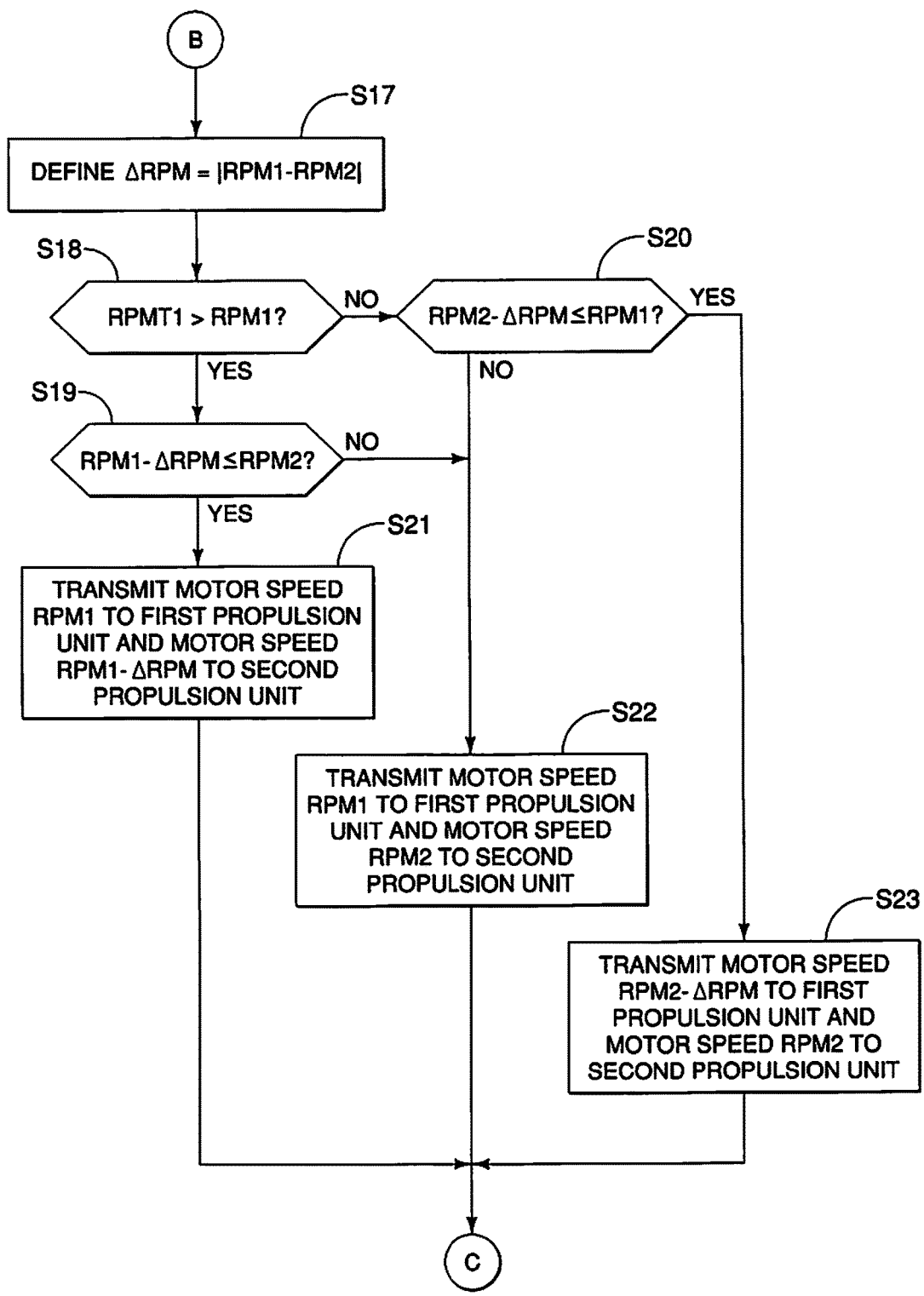
FIG. 18 is a third portion of the flow chart illustrated in FIGS. 16 and 17, which is executed by a main controller of the portable main control module illustrated in FIGS. 1 to 3.

Referring now to FIGS. 16 to 18, a flow chart is illustrated to depict a control program that is executed by the main controller 40 of the portable main control module 14. This control program is continuously executed by the main controller 40 once the portable main control module 14 is turned on. While the control process is illustrated as controlling only two submersible propulsion units, the control process can be used with any number (one or more) of the submersible propulsion units. Here, for the sake of simplicity, the submersible propulsion units 16A and 16B shall be simply referred to as the first and second propulsion units 16A and 16B.

Basically, in the flow chart depicted in FIGS. 16 to 18, the main controller 40 is programmed to output first and second control signals to control the speeds of the first and second motors 64 of the first and second submersible propulsion units 16A and 16B, respectively, via the first and second motor controllers 68 based on first and second feedback signals containing first and second propulsion unit data that is received from the first and second sub-two-way communication devices 70. The first and second propulsion unit data can include battery condition data (e.g., voltage, current, battery capacity and battery temperature) and motor condition data (e.g., actual output shaft rpm and motor temperature). Thus, for example, in the flow chart depicted in FIGS. 16 to 18, the main controller 40 can calculate motor speeds of the motors 64 based on detection signals from the speed sensors 79. Alternatively, the main controller 40 can estimate motor speeds of the motors 64 based on battery capacity and/or battery voltage. In any case, by using the first and second propulsion unit data, the main controller 40 can balance the thrust outputted by the first and second submersible propulsion units 16A and 16B such that the aquatic vessel 12 goes straight.

In step S1, the main controller 40 receives propulsion unit data of the first and second propulsion units 16A and 16B that are within the communication area of the portable main control module 14. Specifically, each of the motor controllers 68 of the submersible propulsion units 16A and 16B is configured to transmit at least once a propulsion unit ID within the predetermined time from activation of the portable main control module 14 to initialize communication. Thus, once the user turns on the first and second propulsion units 16A and 16B using the on/off switches 76, the sub-two-way communication devices 70 of the first and second propulsion units 16A and 16B will start transmitting the propulsion unit ID's.

In step S2, the main controller 40 determines if a malfunction signal is received from one of the first and second propulsion units 16A and 16B. Specifically, the first and second propulsion units 16A and 16B will transmit a malfunction signal if one of the water leak detectors 72 or 74 detects a leak in one of the first and second propulsion units 16A and 16B. Also, the first and second propulsion units 16A and 16B will transmit a malfunction signal upon determining that an overcurrent condition and/or an overvoltage condition exists in one of the first and second propulsion units 16A and 16B. In addition, the first and second propulsion units 16A and 16B will transmit a malfunction signal upon determining that the fuse 78 has blown in one of the first and second propulsion units 16A and 16B. Moreover, the first and second propulsion units 16A and 16B will transmit a malfunction signal upon determining that the battery capacity of one of the batteries 66 is below a prescribed threshold in one of the first and second propulsion units 16A and 16B. Thus, the main controller 40 is programmed to stop the first and second submersible propulsion units 16A and 16B at the same time upon detecting one of the first and second submersible propulsion units 16A and 16B being an unintentional stop condition (overcurrent condition existing, low battery capacity, fuse blown, etc.). If the main controller 40 receives a malfunction signal, then the process proceeds to step S3. However, if the main controller 40 does not receives a malfunction signal, then the process proceeds to step S4.

In step S3, the main controller 40 execute a failsafe mode. Here, the failsafe mode can merely be the main controller 40 transmitting stop signals to the first and second propulsion units 16A and 16B.

In step S4, the main controller 40 execute a recognition process of the number of propulsion units. The main controller 40 is programmed to identify the submersible propulsion units 16A and 16B to be controlled within a predetermined time from activation of the portable main control module 14. In the recognition process, the main controller 40 conducts a pairing process and stores the propulsion unit ID's in memory so that the pairing process does not need to be conducted in subsequent uses of the aquatic jet propulsion device 10. Thus, in the first embodiment, the main controller 40 will recognize two propulsion units (i.e., the first and second propulsion units 16A and 16B) if they are functioning properly and have sufficient battery capacities. Also in the recognition process, the main controller 40 determines the control procedure to be used to control the speeds of the propulsion units based on the number of propulsion units that are recognized. Accordingly, the main controller 40 determines the location and number of the propulsion units being used.

In step S5, the main controller 40 determines if the number of signals equal to the number of propulsion units. The main controller 40 is programmed to identify the submersible propulsion units 16A and 16B to be controlled within a predetermined time from activation of the portable main control module 14. If the main controller 40 determines the number of signals is not equal to the number of propulsion units (e.g., communication with one of the submersible propulsion units 16A and 16B has stopped), then the process proceeds to step S3 to execute the failsafe mode in which the main controller is programmed to stop both of the first and second motors of the first and second submersible propulsion units upon loss of communication with one of the first and second motors 64 of the first and second submersible propulsion units 16A and 16B. However, if the main controller 40 determines the number of signals is equal to the number of propulsion units, then the process proceeds to step S6.

In step S6, the main controller 40 receives the propulsion unit data of all recognized propulsion units and stores the propulsion unit data. In this way, the main controller 40 receives all of the battery voltages of the batteries 66 so as to determine if the speeds of the motors 64 may need to be limited. Then the process proceeds to step S7.

In step S7, based on the current propulsion unit data, the main controller 40 calculates a first maximum motor speed RPM1 for the first propulsion unit 16A based on the voltage received from the first propulsion unit 16A and a second maximum motor speed RPM2 for the second propulsion unit 16B based on the voltage received from the second propulsion unit 16B. Alternatively, the main controller 40 can calculate the first and second maximum motor speeds RPM1 and RPM2 for the first and second propulsion units 16A and 16B based on the battery capacities of the batteries 66 of the first and second propulsion units 16A and 16B. Then the process proceeds to step S8.

In step S8, the main controller 40 determines if a speed signal inputted has been inputted by the user using the user input interface 26. If no speed signal is inputted by a user, then the process returns to step S1 to restart the process. However, if a speed signal is inputted by a user, then the process proceeds to step S9.

In step S9, the main controller 40 calculate a first target motor speed RPMT1 for the first propulsion unit 16A and a second target motor speed RPMT2 for the second propulsion unit 16B to achieve target input speed that the user inputted. Then the process proceeds to step S10.

In step S10, the main controller 40 determines if the first and second target motor speeds RPMT1 and RPMT2 are equal to or less than the first and second maximum motor speeds RPM1 and RPM2 (i.e., RPMT1≤RPM1 and RPMT2≤RPM2). If the main controller 40 determines that both of the first and second target motor speeds RPMT1 and RPMT2 are equal to or less than the first and second maximum motor speeds RPM1 and RPM2, then the main controller 40 determines that the speeds of the motors 64 do not need to be limited and the process proceeds to step S11.

In step S11, the main controller 40 transmits the target motor speeds RPMT1 and RPMT2 to the first and second propulsion units 16A and 16B, respectively. In this way, the main controller 40 can make sure that the aquatic vessel 12 moves in a straight path. Then the process returns to step S1 to restart the process.

However, in step S10, if the main controller 40 determines that one of the first and second target motor speeds RPMT1 and RPMT2 is greater than the first and second maximum motor speeds RPM1 and RPM2, then the main controller 40 determines that the speeds of the motors 64 need to be limited to the lower value of the first and second maximum motor speeds RPM1 and RPM2. By repeating step S10 in each cycle, the main controller 40 uses feedback control to adjust the voltage to the motors 64 of the first and second propulsion units 16A and 16B, respectively, based on one or more of the detection results from the motor speed detectors 79, the motor condition data and the battery condition data. Here, for example, the main controller 40 is programmed to use the first and second voltage data to control the speeds of the first and second motors 64 of the first and second submersible propulsion units 16A and 16B to be substantially equal for going straight. Alternatively, the main controller 40 is programmed to use the first and second motor data to control the speeds of the first and second motors 64 of the first and second submersible propulsion units 16A and 16B to be substantially equal. In either case, the main controller 40 is programmed to control the speeds of the first and second motors 64 of the first and second submersible propulsion units 16A and 16B to be substantially equal upon determining an operator's intention to go straight in either a forward direction or a backward direction. In particular, the main controller 40 is programmed to adjust the speed of one of the first and second motors 64 of the first and second submersible propulsion units 16A and 16B using feedback control based on the other of the first and second motors 64 of the first and second submersible propulsion units 16A and 16B upon determining the other of the first and second motors 64 of the first and second submersible propulsion units 16A and 16B has a smaller speed output than the one of the first and second motors 64 of the first and second submersible propulsion units 16A and 16B. Alternatively, in step S11, the main controller 40 is programmed to adjust the speed of one of the first and second motors 64 of the first and second submersible propulsion units 16A and 16B using feedback control based on the other of the first and second motors 64 of the first and second submersible propulsion units 16A and 16B upon determining the other of the first and second motors 64 of the first and second submersible propulsion units 16A and 16B has a smaller battery capacity than the one of the first and second motors 64 of the first and second submersible propulsion units 16A and 16B. Thus, the process proceeds to step S12.

In step S12, the main controller 40 determines if the user wants to move forward or reverse in a straight path or wants to turn. In particular, the main controller 40 determines if the first and second target motor speeds RPMT1 and RPMT2 are equal or not (i.e., RPMT1=RPMT2). If the first and second target motor speeds RPMT1 and RPMT2 are equal, then the user wants to go straight and the process proceeds to step S13. However, if the first and second target motor speeds RPMT1 and RPMT2 are not equal then the user wants to turn and the process proceeds to step S17.

In step S13, the main controller 40 determines which of the first and second maximum motor speeds has the lower value (i.e., RPM1>RPM2). If the main controller 40 determines the first maximum motor speed RPM1 has the lower value, then process proceeds to step S14 where the main controller 40 transmit the motor speed RPM1 to all propulsion units 16A and 16B. However, if the main controller 40 determines the second maximum motor speed RPM2 has the lower value, then process proceeds to step S14 where the main controller 40 transmit the motor speed RPM1 to all propulsion units 16A and 16B. Then after steps S14 and S15, the process proceeds to step S16.

In step S16, the main controller 40 activates the battery condition indicator 35 to indicate the motor speed is limited due to a low battery condition of one of the batteries 66. Then the process returns to step S1 to restart the process.

However, in step S12, if the first and second target motor speeds RPMT1 and RPMT2 are not equal then the user wants to turn and the process proceeds to step S17. In step S17, the main controller 40 calculates the motor speed difference ΔRPM between the first maximum motor speed RPM1 and the second maximum motor speeds RPM2 (i.e., ΔRPM=|RPM1−RPM2|). Then the process proceeds to step S18.

In step S18, the main controller 40 determines if the first target motor speed RPMT1 is greater than the first maximum motor speed RPM1 (i.e., RPMT1>RPM1). If the first target motor speed RPMT1 is greater than the first maximum motor speed RPM1, then the main controller 40 determines that the speed of the motor 64 of the first propulsion unit 16A is limited by the first maximum motor speed RPM1 of the first propulsion unit 16A. Thus, the process proceeds to step S19 to determine the speed of the motor 64 of the second propulsion unit 16B.

In step S19, the main controller 40 determines the speed of the motor 64 of the second propulsion unit 16B by comparing the first maximum motor speed RPM1 minus the motor speed difference ΔRPM to the second maximum motor speed RPM2 (i.e., RPM1−ΔRPM≤RPM2). If the main controller 40 determines the first maximum motor speed RPM1 minus the motor speed difference ΔRPM is less than or equal to the second maximum motor speed RPM2, then the process proceeds to step S21 and transmits the motor speed RPM1 to the first propulsion unit 16A and the motor speed RPM1−ΔRPM to the second propulsion unit 16B. On the other hand, if the main controller 40 determines the first maximum motor speed RPM1 minus the motor speed difference ΔRPM is greater than the second maximum motor speed RPM2, then the process proceeds to step S22 and transmits the motor speed RPM1 to the first propulsion unit 16A and the motor speed RPM2 to the second propulsion unit 16B.

However, in step S18, if the first target motor speed RPMT1 is less than the first maximum motor speed RPM1, then the main controller 40 determines that the speed of the motor 64 of the first propulsion unit 16A is not limited by the first maximum motor speed RPM1 of the first propulsion unit 16A. Rather, the main controller 40 determines that the speed of the motor 64 of the second propulsion unit 16B is limited by the second maximum motor speed RPM2 of the second propulsion unit 16B. Thus, the process proceeds to step S20.

In step S20, the main controller 40 determines if determines the speed of the motor 64 of the first propulsion unit 16A by comparing the second maximum motor speed RPM2 minus the motor speed difference ΔRPM to the first maximum motor speed RPM1 (i.e., RPM2−ΔRPM≤RPM1). If the main controller 40 determines the second maximum motor speed RPM2 minus the motor speed difference ΔRPM is greater than the first maximum motor speed RPM1, then the process proceeds to step S22 and transmits the motor speed RPM1 to the first propulsion unit 16A and the motor speed RPM2 to the second propulsion unit 16B. On the other hand, if the main controller 40 determines the second maximum motor speed RPM2 minus the motor speed difference ΔRPM is equal to or less than the first maximum motor speed RPM1, then the process proceeds to step S23 and transmits the motor speed RPM2−ΔRPM to the first propulsion unit 16A and the motor speed RPM2 to the second propulsion unit 16B.

In step S22, the main controller 40 transmits the motor speed RPM1 to the first propulsion unit 16A and the motor speed RPM2 to the second propulsion unit 16B.

In step S23, the main controller 40 transmits the motor speed RPM2−ΔRPM to the first propulsion unit 16A and the motor speed RPM2 to the second propulsion unit 16B.

In steps S21, S22 and S23, the main controller 40 is programmed to make a turn by reversing thrust of one of the first and second motors 64 of the first and second submersible propulsion units 16A and 16B while maintaining thrust of the other of the first and second motors 64 of the first and second submersible propulsion units 16A and 16B in a forward direction.

After each of the steps S21, S22 and S23, the process proceeds to step S16, where the main controller 40 activates the battery condition indicator 35 to indicate the motor speed is limited due to a low battery condition of one of the batteries 66. Then the process returns to step S1 to restart the process.

In performing a turn, typically, the motor 64 located on the side in the direction of the turn will be reversed to aid in turn in the desired direction. However, in performing a rapid 180 degree turn, the main controller 40 is programmed to reverse the thrust of the one of the first and second motors 64 of the first and second submersible propulsion units 16A and 16B that is determined to have a smaller speed output. Alternatively, in performing a rapid 180 degree turn, the main controller 40 is programmed to reverse the thrust of the one of the first and second motors 64 of the first and second submersible propulsion units 16A and 16B that is determined to have a smaller battery capacity. With this alternative programming the aquatic vessel 12 can be turn rapidly by using the motor 64 of the first and second submersible propulsion units 16A and 16B that has the highest maximum thrust in a forward driving direction and using the motor 64 of the first and second submersible propulsion units 16A and 16B with the lower thrust in a rearward driving direction.

Figure 19:
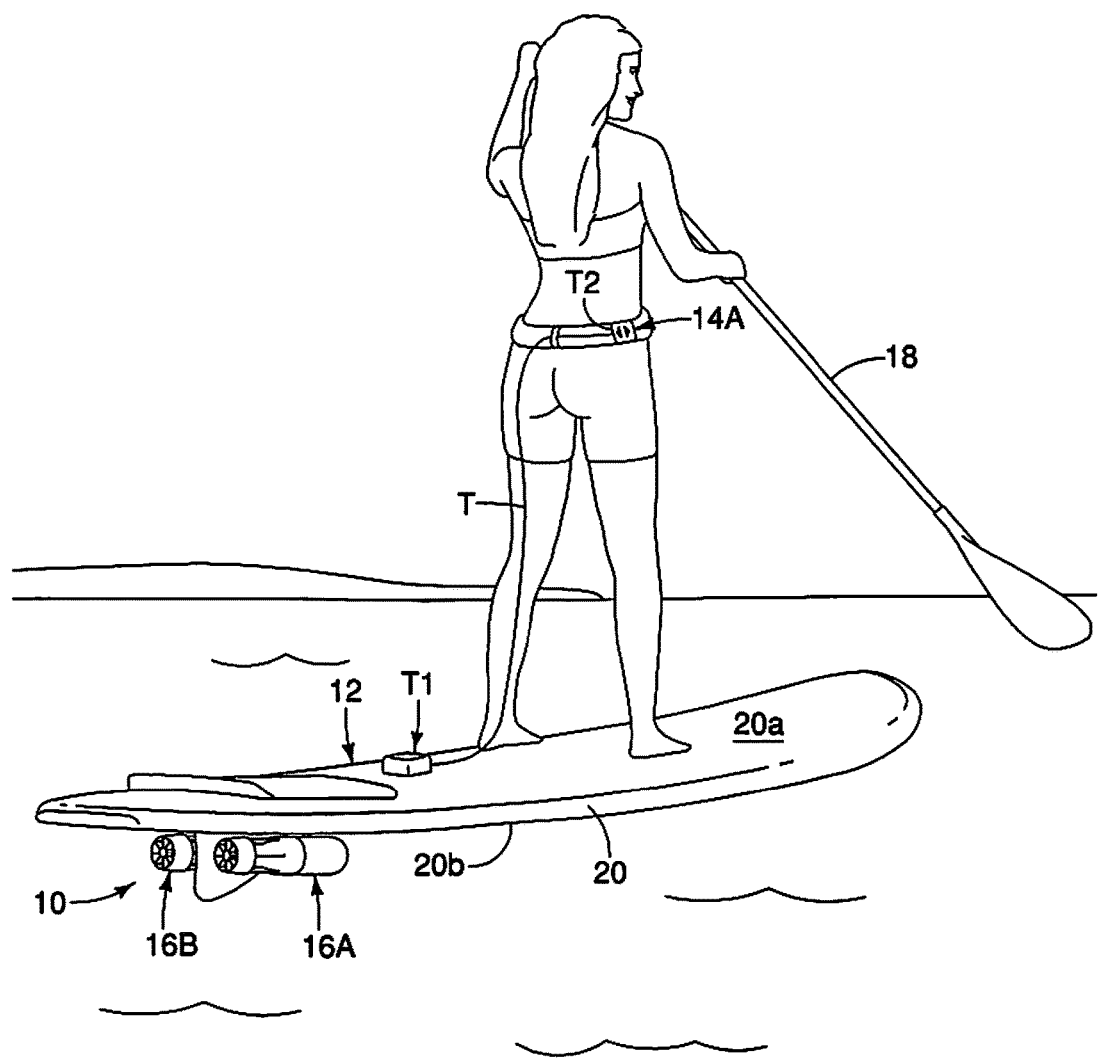
FIG. 19 is a rear perspective view of an aquatic jet propulsion device in accordance with a first modification in which the portable main control module is connected to the aquatic vessel (i.e., a stand up paddle board) by a tether.

Referring now to FIG. 19, an aquatic jet propulsion device 10A is illustrated in accordance with another embodiment. Here, the aquatic jet propulsion device 10A comprises a portable main control module 14A and the submersible propulsion units 16A and 16B of the first embodiment. The portable main control module 14A is identical to the portable main control module 14 of the first embodiment except that the portable main control module 14A is configured to be worn on a user's waist and further comprises a tether T. The tether T has a first end T1 configured to be attached to the aquatic vessel 12 and a second end T2 attached to the portable main control module 14A. Preferably, the tether T is detachably mounted to the portable main control module 14A such that detachment of the tether T from the portable main control module 14 inputs a signal to the main controller 40 to indicate that the tether T has been detached from portable main control module 14A. The second end T2 of the tether T can be attached to the portable main control module 14A by a magnet. The portable main control module 14A can include a magnetic sensor as in one of the later embodiments to detect the detachment of the tether T from the portable main control module 14. Upon detachment of the tether T from the portable main control module 14, the main controller 40 will stop the submersible propulsion units 16A and 16B. Alternatively, the magnet and the magnetic sensor can be provided at the first end T1 of the tether T where the tether T is attached to the aquatic vessel 12. In other words, the main controller 40 is programmed to stop both of the first and second motors 64 of the first and second submersible propulsion units 16A and 16B upon detachment of the tether T from one of the aquatic vessel 12 and the portable main control module 14. Alternatively, the stopping of the motors can be based on the distance of the magnet from the magnetic sensor rather than the mere detachment of the tether T. In this case, the main controller 40 is programmed to stop both of the first and second motors 64 of the first and second submersible propulsion units 16A and 16B upon determining a distance of between the portable main control module 14 and one of the first and second submersible propulsion units 16A and 16B is greater than a prescribed distance threshold.

Figure 20:
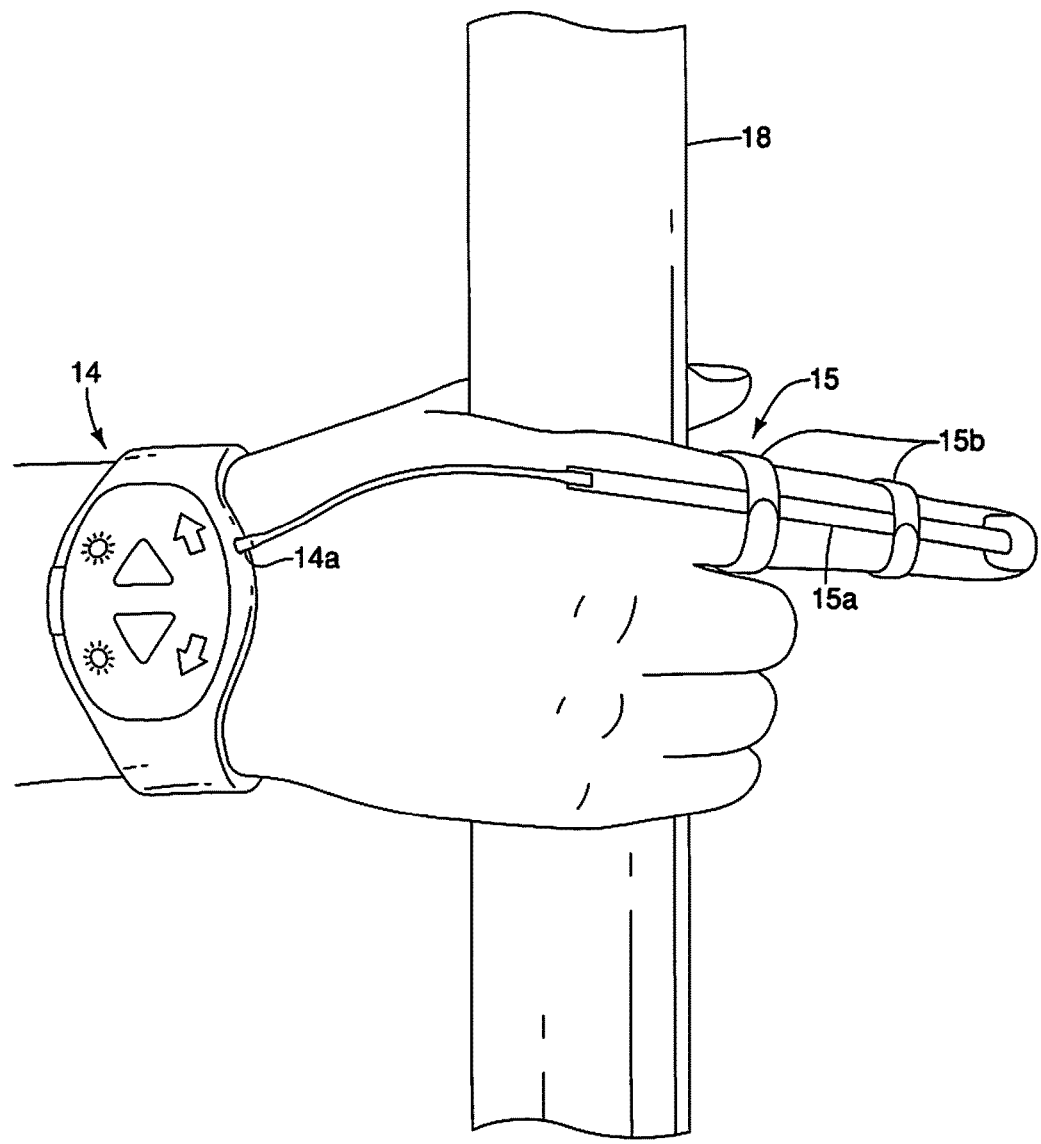
FIG. 20 is a perspective view of a portable main control module provided with a joint movement input device having a joint attachment and an input member that inputs a control signal upon being flexed in accordance with another modification of the first embodiment.

Referring now to FIG. 20, a portable main control module 14B is provided with a joint movement input device 15. The portable main control module 14B is identical to the portable main control module 14 of the first embodiment except for the addition of the joint movement input device 15. The joint movement input device 15 has an input member 15a and a joint attachment 15b. The input member 15a inputs a control signal to the main controller 40 upon being flexed. While the joint attachment 15b configured to be mounted to a user's finger, it will be apparent from this disclosure that the joint attachment 15b can be configured to be used with any joint. In one embodiment, the joint movement input device 15 is a speed input control device that sends a speed control signal to the main controller 40 based on the amount that the user's finger is bent. When the user's finger is straight, the main controller 40 will stop the motors 64 of each of the submersible propulsion units 16A and 16B. The more the user's finger is bent, the faster the main controller 40 will operate the motors 64.

Figure 21:
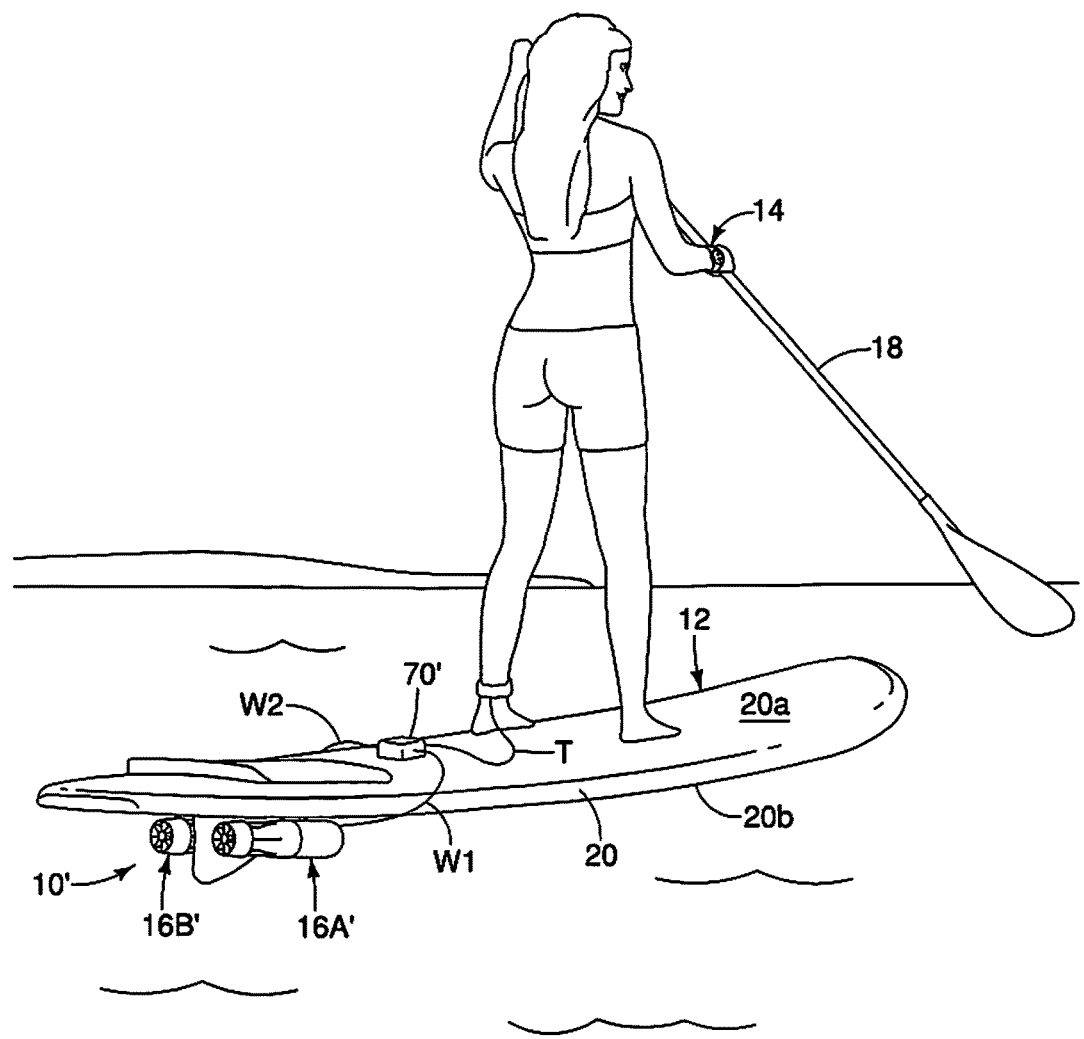
FIG. 21 is a rear perspective view of an aquatic vessel (i.e., a stand up paddle board) equipped with an aquatic jet propulsion device, in which the aquatic jet propulsion device includes a portable main control module, a pair of submersible propulsion units and a single sub-two-way communication device shared by the submersible propulsion units in accordance with another illustrated embodiment.
Figure 22:
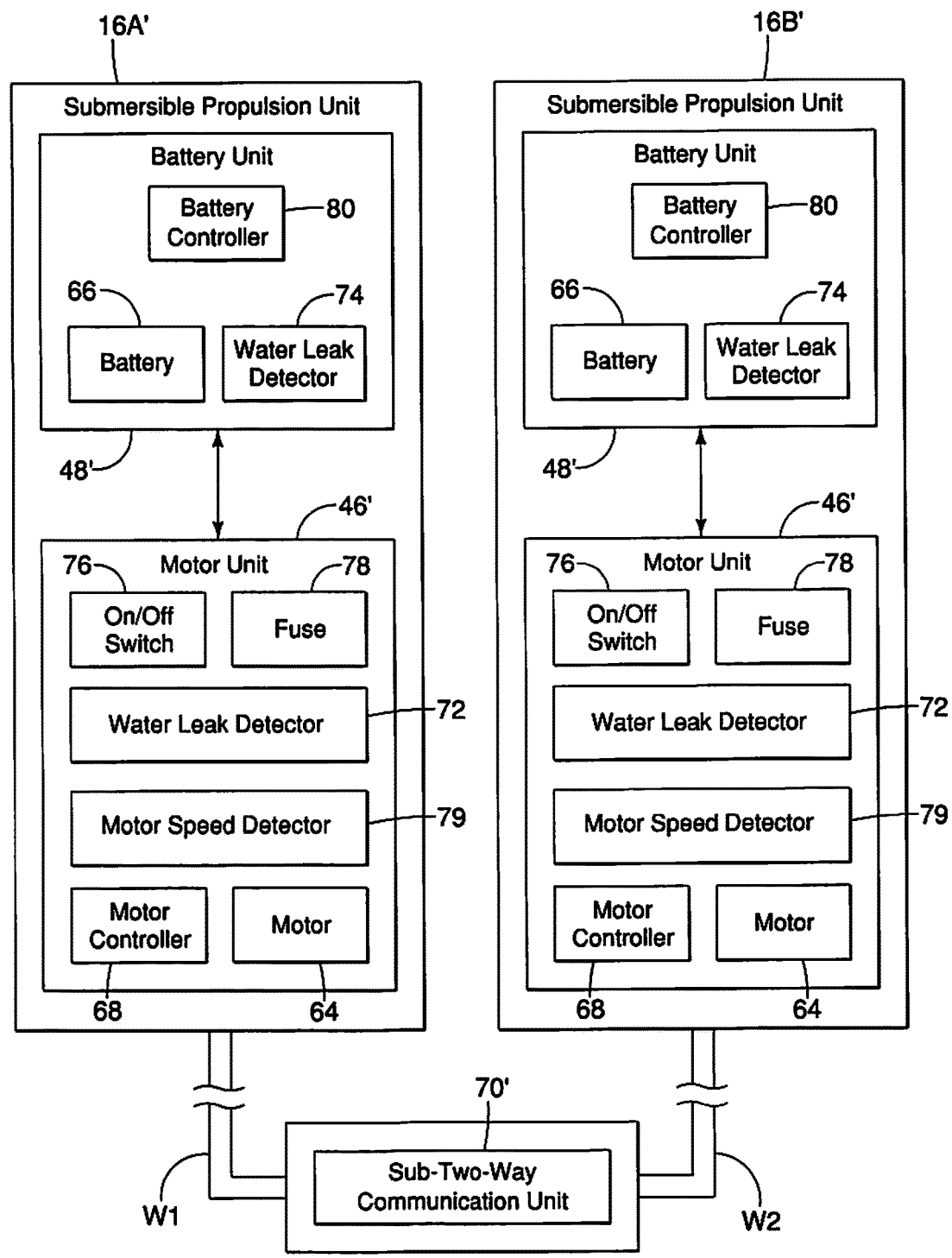
FIG. 22 is a block diagram of the submersible propulsion units and the sub-two-way communication device of the aquatic jet propulsion device illustrated in FIG. 21.

Referring now to FIGS. 21 and 22, an aquatic jet propulsion device 10' is illustrated in accordance with another embodiment. Here, the aquatic jet propulsion device 10' comprises the portable main control module 14 of the first embodiment and a pair submersible propulsion units 16A' and 16B'. The submersible propulsion units 16A' and 16W are attached to the below water level surface 20b with the floating body 20 of the aquatic vessel 12 in the same manner as in the first embodiment as discussed above. The submersible propulsion units 16A' and 16B' are identical to each other, and each includes a motor unit 46' and a battery unit 48' that are connected together in the same manner that the motor unit 46 and the battery unit 48 are connected together in the first embodiment as discussed above. The motor unit 46' includes the motor 64, the motor controller 68, the water leak detector 72, the on-off switch 76 and the fuse 78 of the first embodiment as discussed above. The battery unit 48" includes the battery 66, the water leak detector 74 and the battery controller 80 of the first embodiment as discussed above. Thus, the submersible propulsion units 16A' and 16B' are identical to the submersible propulsion units 16A and 16B of the first embodiment, except that a common sub-two-way communication device 70' is provided that is shared by each of the submersible propulsion units 16A' and 16B'. The sub-two-way communication device 70' is at least partially located outside of the housings the submersible propulsion units 16A' and 16B' on the above water level surface 20a. In particular, the motors 64 and the batteries 66 of the submersible propulsion units 16A and 16B are disposed underneath the below water level surface 20b of the floating body 20, while the sub-two-way communication device 70 is disposed above the above water level surface 20a of the floating body 20. The sub-two-way communication device 70' is electrically connected to the submersible propulsion units 16A' and 16B' by a pair of electrical wires W1 and W2. In this way, the sub-two-way communication device 70' can communicate with the main two-way communication device 42 of the portable main control module 14 without the wireless signal degrading due to the effect of the air to water interface.

Figure 23:
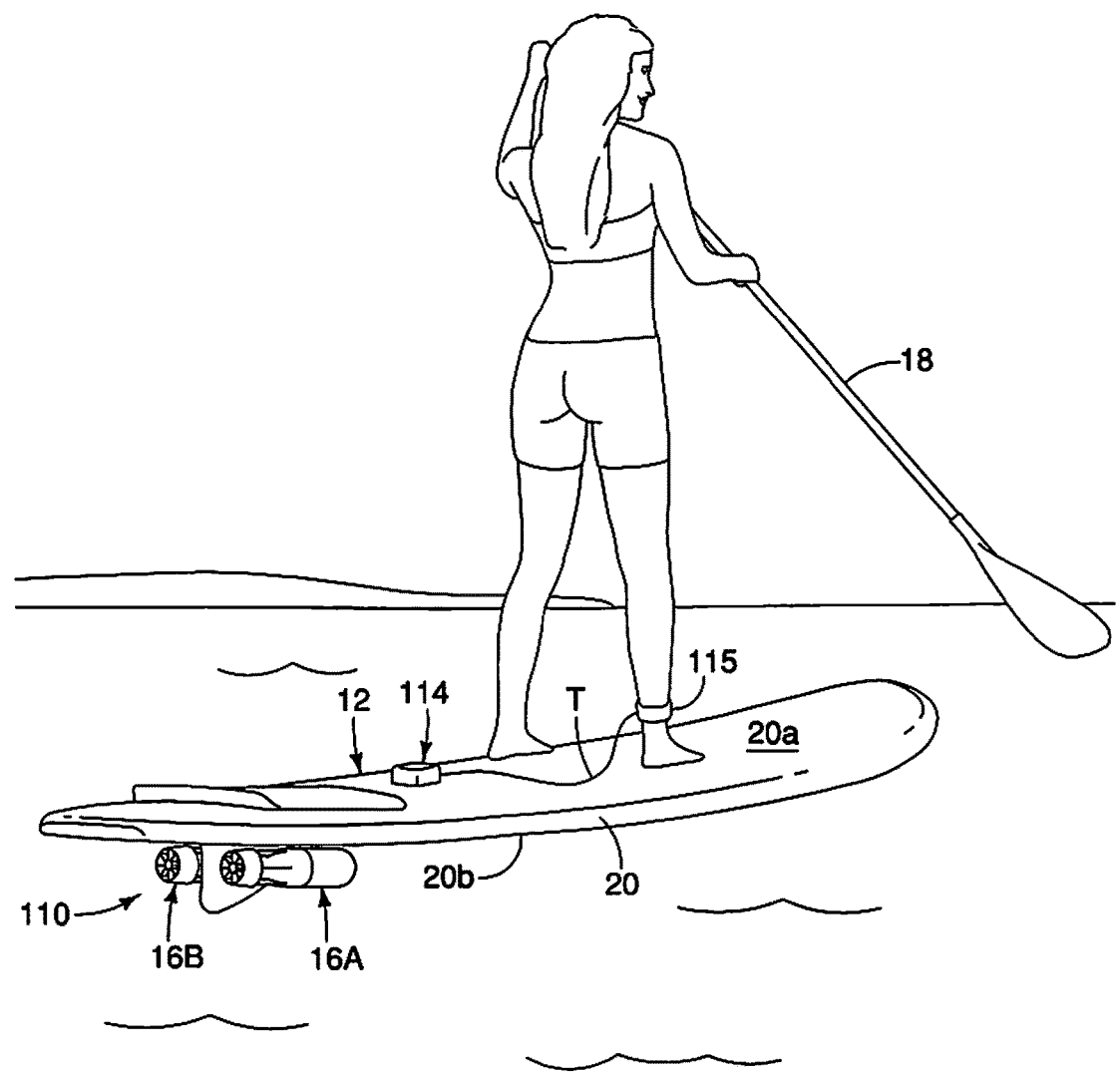
FIG. 23 is a rear perspective view of an aquatic vessel (i.e., a stand up paddle board) equipped with an aquatic jet propulsion device, in which the aquatic jet propulsion device includes a portable main control module and a pair of submersible propulsion units in which the portable main control module is attached to the aquatic vessel in accordance with another illustrated embodiment.
Figure 24:
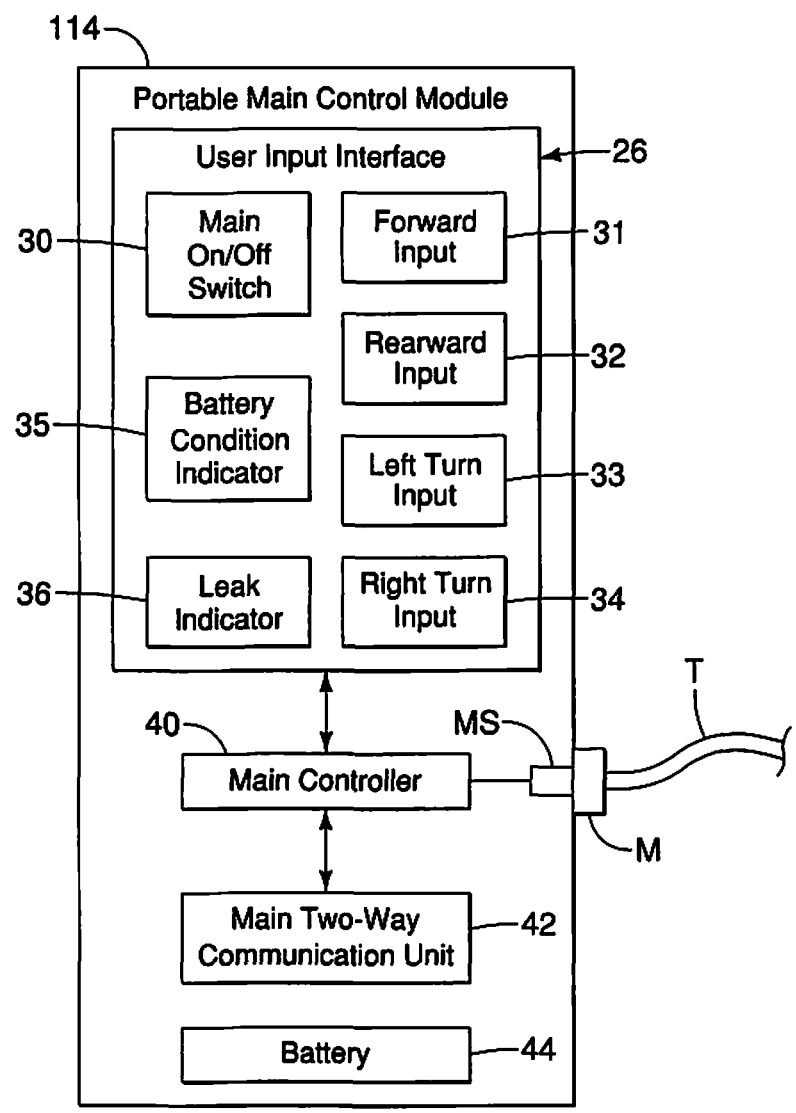
FIG. 24 is a block diagram of the portable main control module for the aquatic jet propulsion device illustrated in FIG. 23.

Referring now to FIGS. 23 and 24, an aquatic jet propulsion device 110 is illustrated in accordance with another embodiment. Here, the aquatic jet propulsion device 110 is installed on the aquatic vessel 12 of the first embodiment. Here, the aquatic jet propulsion device 110 comprises a portable main control module 114 and the submersible propulsion units 16A and 16B of the first embodiment. The portable main control module 114 is detachably mounted to the above water level surface 20a of the floating body 20 by a suitable fastener such as a hook and lop fastener. The portable main control module 114 includes the user input interface 26 of the first embodiment which includes the main on-off switch 30, the forward input 31, the rearward input 32, the left turn input 33, the right turn input 34, the battery condition indicator 35 and the leak indicator 36, which are all discussed above. The portable main control module 214 further includes the main controller 40, the main two-way communication device 42 and the battery 44, which are all discussed above. Accordingly, the portable main control module 114 is identical to the portable main control module 14 of the first embodiment, except that the portable main control module 114 is configured to be mounted on the aquatic vessel 12 and the portable main control module 114 further includes an operator movement detector MS. The operator movement detector MS is a magnetic sensor that is configured to sense the presence or absence of that a magnetic field produced by a magnet M. The magnet M is disposed on one end of a tether T that has an operator attachment portion 115 at the other end. Thus, the tether T has a first end configured to be attached to an operator and a second end attached to the portable main control module 114. The magnet M is detachable held on the operator movement detector MS by a magnetic field of the operator movement detector MS. In this way, the magnetic sensor MS can detect whether or not the user or operator of the aquatic vessel 12 is in the correct position and/or orientation for using or operating the aquatic vessel 12. In particular, if the magnet M of the tether T is pulled off of the portable main control module 114, then a detection signal is generated by the operator movement detector MS. This detection signal is sent to the main controller 40. Then, the main controller 40 is programmed to stop both of the motors 64 of the first and second submersible propulsion units 16A and 16B upon receiving detection signal from the magnetic sensor 110a of the operator movement detector 110 that is indicative of an operator or user being in a non-operating orientation. Here, the main controller 40 is programmed to stop both of the first and second motors 64 of the first and second submersible propulsion units 16A and 16B upon detachment of the tether T from one of the operator and the portable main control module 114.

Figure 25:
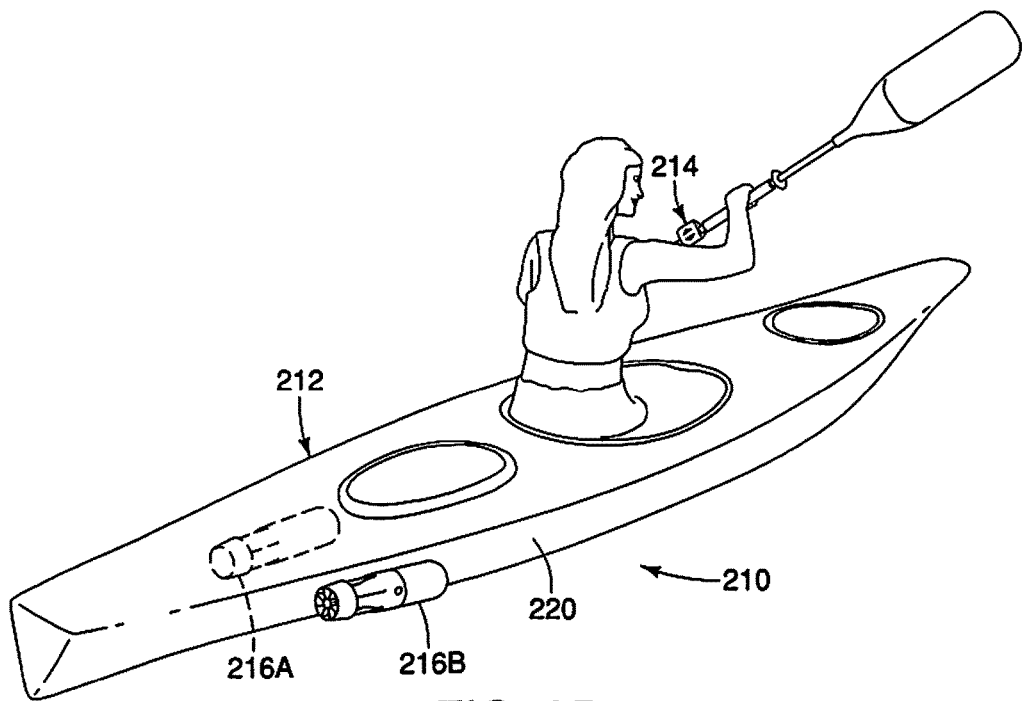
FIG. 25 is a rear perspective view of an aquatic vessel (i.e., a kayak) equipped with an aquatic jet propulsion device in accordance with another illustrated embodiment, in which the aquatic jet propulsion device includes a portable main control module and a pair of submersible propulsion units.
Figure 26:
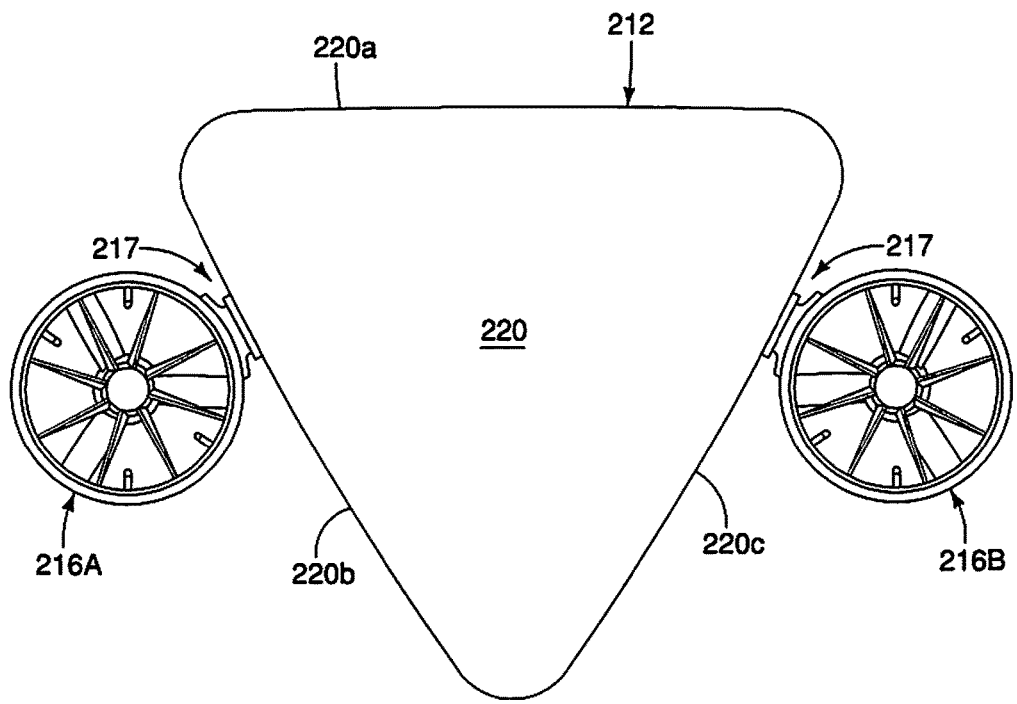
FIG. 26 is a rear end view of the aquatic vessel (i.e., a kayak) illustrated in FIG. 25 in which the V-shaped hull has slanted surfaces with the submersible propulsion units attached to the slanted surfaces of the V-shaped hull.
Figure 27:
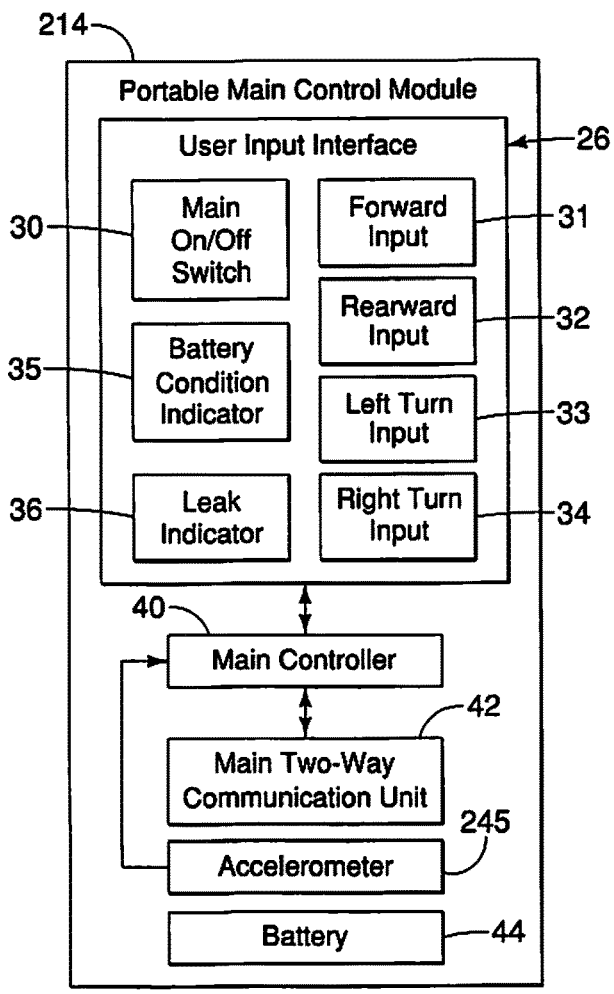
FIG. 27 is a block diagram of the portable main control module for the aquatic jet propulsion device illustrated in FIGS. 25 and 26.

Referring now to FIGS. 25 to 27, an aquatic jet propulsion device 210 is illustrated in accordance with another embodiment. Here, the aquatic jet propulsion device 210 is installed on a kayak 212, which is another example of an aquatic vessel. The aquatic jet propulsion device 210 comprises a portable main control module 214 and a pair submersible propulsion units 216A and 216B. The submersible propulsion units 216A and 216B are identical to the submersible propulsion units 16A and 16B of the first embodiment. The portable main control module 214 includes the user input interface 26 of the first embodiment which includes the main on-off switch 30, the forward input 31, the rearward input 32, the left turn input 33, the right turn input 34, the battery condition indicator 35 and the leak indicator 36, which are all discussed above. The portable main control module 214 further includes the main controller 40, the main two-way communication device 42 and the battery 44, which are all discussed above. Accordingly, the portable main control module 214 is identical to the portable main control module 14 of the first embodiment, except that the portable main control module 214 includes a paddle attachment 224 that is configured to be attached to the paddle 18, and includes a paddle movement sensor 245 (e.g., an accelerometer). The accelerometer 245 detects the paddling motion by the user. The paddling motion data of the accelerometer 245 is inputted to the main controller 40, which than can operate the motors of the submersible propulsion units 216A and 216B in accordance paddling motion by the user to assisting the paddling motion.

The aquatic vessel 212 comprises a V-shaped hull as a floating body 220 having an above water level surface 220a and a below water level surface defined by a first slanted surface 220b and a second slanted surface 220c. A first one of the submersible propulsion units 16A and 16B is attached to the first slanted surface 220b and a second one of the submersible propulsion units 16A and 16B is attached to the second slanted surface 220c. Here, the submersible propulsion units 16A and 16B are attached to the first and second slanted surfaces 220b and 220c by two mounting brackets 217 that are identical to the mounting brackets 102 shown in FIGS. 14 and 15.

Figure 28:
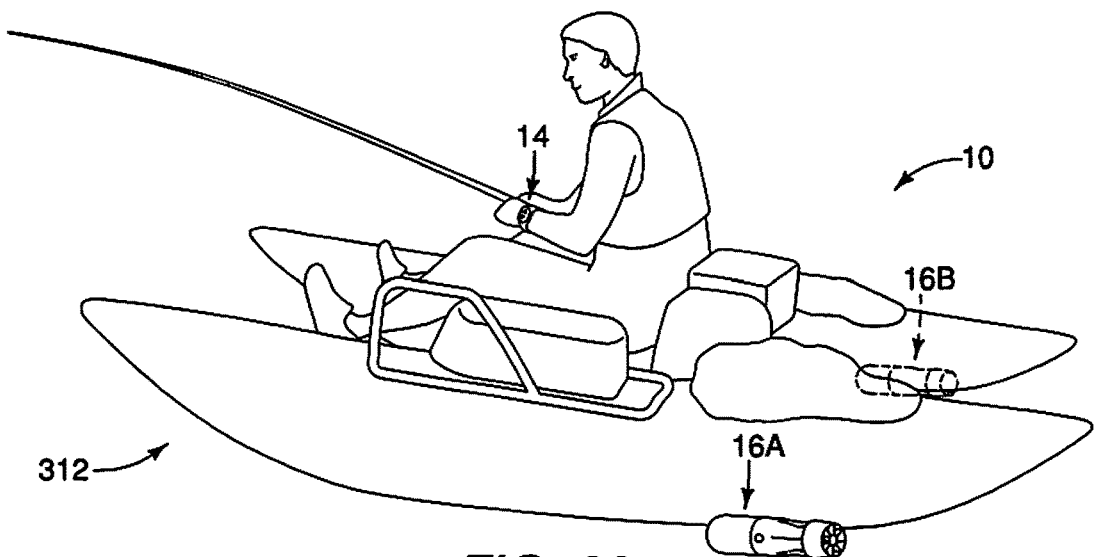
FIG. 28 is a side perspective view of an aquatic vessel (i.e., an inflatable pontoon boat) equipped with an aquatic jet propulsion device in accordance with yet another illustrated embodiment, in which the aquatic jet propulsion device includes a portable main control module and a pair of submersible propulsion units.

Referring now to FIG. 28, the aquatic jet propulsion device 10 of the first embodiment is illustrated as being installed on an aquatic vessel 312 in the form of an inflatable pontoon boat. Here, the submersible propulsion units 16A and 16B are attached to the aquatic vessel 312 using the mounting bracket 102 shown in FIGS. 14 and 15.

Figure 29:
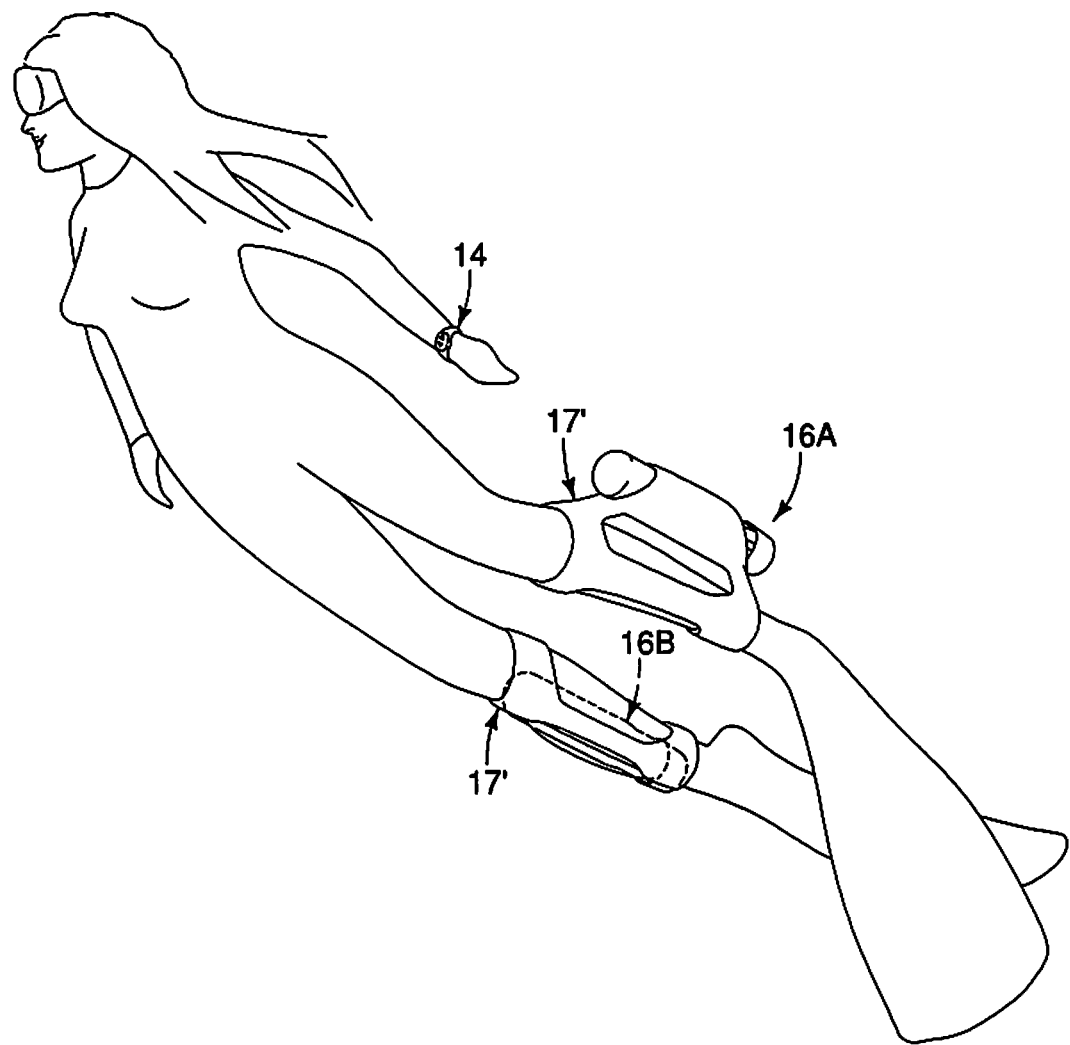
FIG. 29 is a perspective view of a diver attached aquatic jet propulsion device in accordance with a yet still another illustrated embodiment, in which the aquatic jet propulsion device includes a portable main control module and two submersible propulsion units that are the diver's thighs.

Referring now to FIG. 29, the aquatic jet propulsion device 10 of the first embodiment is illustrated as being installed on a diver's thighs. Here, the submersible propulsion units 16A and 16B are attached to the diver's thighs by a pair of attachment members 17' that form an aquatic vessel. The attachment members 17' are configured to mate with the first attachment parts 104 of the submersible propulsion units 16A and 16B.

Figure 30:
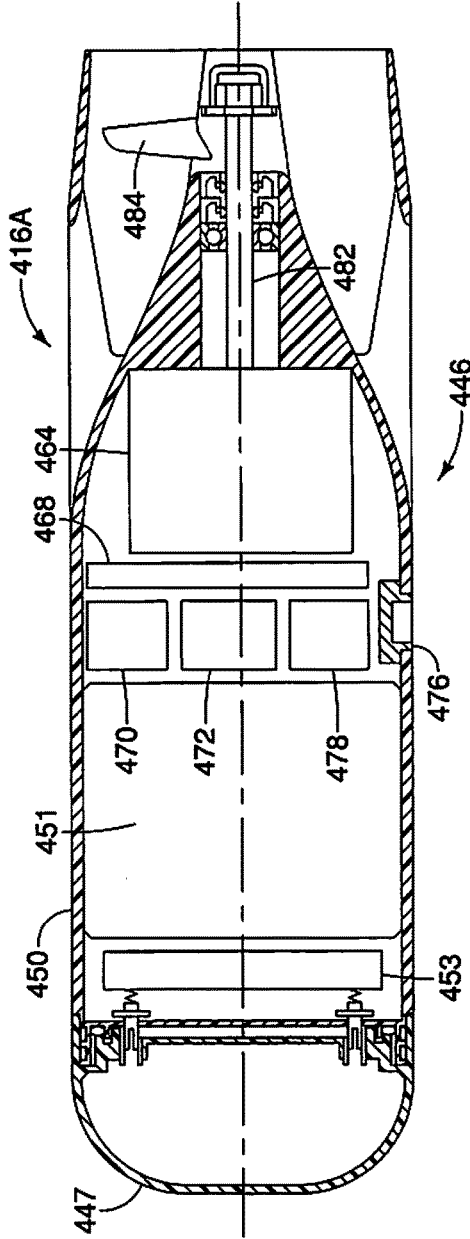
FIG. 30 is a longitudinal cross sectional view of a submersible propulsion unit in accordance with another illustrated embodiment in with the motor unit and the battery unit integrated into a single housing.
Figure 31:
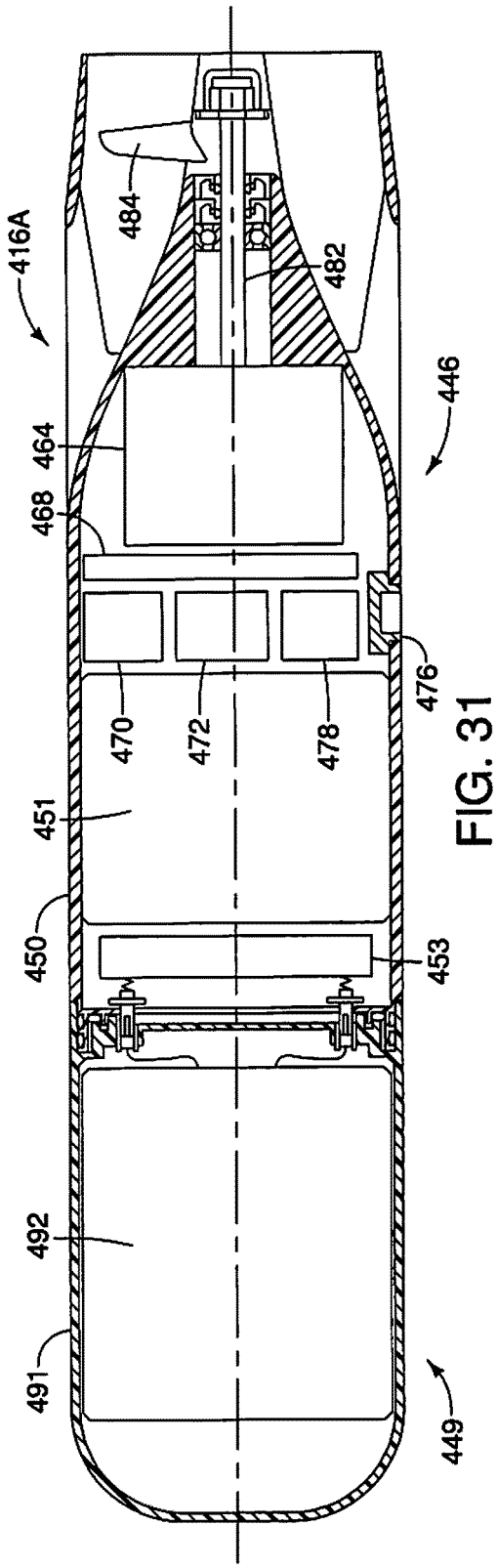
FIG. 31 is a longitudinal cross sectional view of the submersible propulsion unit illustrated in FIG. 30 with its end cap removed and replaced with an additional battery.

Referring now to FIGS. 30 and 31, a submersible propulsion unit 416 is illustrated in accordance with another illustrated embodiment. Here, the submersible propulsion unit 416 includes a motor-battery unit 446 that can have either an end cap 447 (FIG. 30) attached thereto, or an additional battery unit 449 (FIG. 31) attached thereto.

The motor-battery unit 446 is identical to the motor unit 46 as discussed above, except that the motor-battery unit 446 has an extended motor housing 450 that houses an internal battery 451 and a battery controller 453 in addition to the component of the motor unit 46 of the first embodiment. Thus, the motor-battery unit 446 includes a motor 464, a motor controller 468, a sub-two-way communication device 470, a water leak detector 472, an on-off switch 476 and a fuse 478. Since the motor 464, the motor controller 468, the sub-two-way communication device 470, the water leak detector 472, the on-off switch 476 and the fuse 478 are identical to the corresponding components in the motor unit 46 of the first embodiment, these components will not be discussed for the sake of brevity. Similar to the first embodiment, the submersible propulsion unit 416 has a motor speed detector (not shown). Also the motor 464 has an output shaft 482 with a propeller 484 fixedly mounted to the output shaft 482 in the same manner as the first embodiment.

The end cap 447 and the additional battery unit 449 are attached the motor-battery unit 446 in the same manner that the battery unit 48 is attached to the motor unit 46. However, the end cap 447 does not include any electrical components, but rather is designed to protect the electrical contracts of the motor-battery unit 446. On the other hand, the additional battery unit 449 has a battery housing 491 that contains at least one additional battery 492.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to an aquatic vessel floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An aquatic jet propulsion device comprising:
a portable main control module including a main controller and a main two-way communication device;
a first submersible propulsion unit including a first motor, a first battery electrically connected to the first motor and a first motor controller operatively connected to the first motor to control a speed of the first motor;
a first sub-two-way communication device configured to communicate with the main two-way communication device;
a second submersible propulsion unit including a second motor, a second battery electrically connected to the second motor and a second motor controller operatively connected to the second motor to control a speed of the second motor; and
a second sub-two-way communication device configured to communicate with the main two-way communication device, and
the main controller being programmed to output a first control signal to control the speed of the first motor of the first submersible propulsion unit via the first motor controller based on a first feedback signal containing first propulsion unit data that is received from the first sub-two-way communication device, with the first propulsion unit data being indicative of an operation condition of the first submersible propulsion unit, and
the main controller being programmed to output a second control signal to control the speed of the second motor of the second submersible propulsion unit via the second motor controller based on a second feedback signal containing second propulsion unit data that is received from the second sub-two-way communication device.

2. The aquatic jet propulsion device according to claim 1, wherein
the first sub-two-way communication device is programmed to transmit battery condition data as the first propulsion unit data to the main two-way communication device.

3. The aquatic jet propulsion device according to claim 1, wherein the first sub-two-way communication device is programmed to transmit motor condition data as the first propulsion unit data to the main two-way communication device.

4. The aquatic jet propulsion device according to claim 1, wherein
the main controller is programmed to independently control the speeds of the first and second motors of the first and second submersible propulsion units.

5. The aquatic jet propulsion device according to claim 4, wherein
the main controller is programmed to control the speeds of the first and second motors of the first and second submersible propulsion units to be substantially equal upon determining an operator's intention to go straight in either a forward direction or a backward direction.

6. The aquatic jet propulsion device according to claim 4, wherein
the first and second sub-two-way communication devices are programmed to transmit first and second voltage data as the first and second propulsion unit data, respectively, to the main two-way communication device, and
the main controller is programmed to use the first and second voltage data to control the speeds of the first and second motors of the first and second submersible propulsion units to be substantially equal.

7. The aquatic jet propulsion device according to claim 1, wherein
the main controller is programmed to stop both of the first and second motors of the first and second submersible propulsion units upon loss of communication with one of the first and second motors of the first and second submersible propulsion units.

8. The aquatic jet propulsion device according to claim 1, wherein
the main controller is programmed to stop both of the first and second motors of the first and second submersible propulsion units upon determining a distance of between the portable main control module and one of the first and second submersible propulsion units is greater than a prescribed distance threshold.

9. The aquatic jet propulsion device according to claim 1, wherein
the main controller is programmed to stop the first and second submersible propulsion units at the same time upon detecting one of the first and second submersible propulsion units being an unintentional stop condition.

10. The aquatic jet propulsion device according to claim 1, wherein
the portable main control module includes an operator movement detector; and
the main controller is programmed to stop both of the first and second motors of the first and second submersible propulsion units upon receiving a signal from the operator movement detector indicative of an operator being in a non-operating orientation.

11. The aquatic jet propulsion device according to claim 10, wherein
the operator movement detector includes a magnetic sensor.

12. The aquatic jet propulsion device according to claim 1, further comprising
a tether having a first end configured to be attached to an aquatic vessel and a second end attached to the portable main control module, and the main controller is programmed to stop both of the first and second motors of the first and second submersible propulsion units upon detachment of the tether from one of the aquatic vessel and the portable main control module.

13. The aquatic jet propulsion device according to claim 1, further comprising
a tether having a first end configured to be attached to an operator and a second end attached to the portable main control module, and
the main controller is programmed to stop both of the first and second motors of the first and second submersible propulsion units upon detachment of the tether from one of the operator and the portable main control module.

14. The aquatic jet propulsion device according to claim 1, wherein
each of the first and second submersible propulsion units includes a water leak detector, and
the main controller is programmed to stop both of the first and second motors of the first and second submersible propulsion units upon receiving a leak detection signal from one of the water leak detectors.

15. An aquatic jet propulsion device comprising:
a portable main control module including a main controller and a main two-way communication device;
a first submersible propulsion unit including a first motor, a first battery electrically connected to the first motor and a first motor controller operatively connected to the first motor to control a speed of the first motor;
a first sub-two-way communication device configured to communicate with the main two-way communication device;
a second submersible propulsion unit including a second motor, a second battery electrically connected to the second motor and a second motor controller operatively connected to the second motor to control a speed of the second motor; and
a second sub-two-way communication device configured to communicate with the main two-way communication device,
the main controller being programmed to output a first control signal to control the speed of the first motor of the first submersible propulsion unit via the first motor controller based on a first feedback signal containing first propulsion unit data that is received from the first sub-two-way communication device,
the main controller being programmed to output a second control signal to control the speed of the second motor of the second submersible propulsion unit via the second motor controller based on a second feedback signal containing second propulsion unit data that is received from the second sub-two-way communication device,
the main controller being programmed to independently control the speeds of the first and second motors of the first and second submersible propulsion units,
the first and second sub-two-way communication devices being programmed to transmit first and second motor condition data as the first and second propulsion unit data, respectively, to the main two-way communication device, and
the main controller being programmed to use the first and second motor condition data to control the speeds of the first and second motors of the first and second submersible propulsion units to be substantially equal.

16. An aquatic jet propulsion device comprising:
a portable main control module including a main controller and a main two-way communication device;
a first submersible propulsion unit including a first motor, a first battery electrically connected to the first motor and a first motor controller operatively connected to the first motor to control a speed of the first motor;
a first sub-two-way communication device configured to communicate with the main two-way communication device;
a second submersible propulsion unit including a second motor, a second battery electrically connected to the second motor and a second motor controller operatively connected to the second motor to control a speed of the second motor; and
a second sub-two-way communication device configured to communicate with the main two-way communication device,
the main controller being programmed to output a first control signal to control the speed of the first motor of the first submersible propulsion unit via the first motor controller based on a first feedback signal containing first propulsion unit data that is received from the first sub-two-way communication device,
the main controller being programmed to output a second control signal to control the speed of the second motor of the second submersible propulsion unit via the second motor controller based on a second feedback signal containing second propulsion unit data that is received from the second sub-two-way communication device,
the main controller being programmed to independently control the speeds of the first and second motors of the first and second submersible propulsion units,
the main controller being programmed to adjust the speed of one of the first and second motors of the first and second submersible propulsion units based on the other of the first and second motors of the first and second submersible propulsion units upon determining the other of the first and second motors of the first and second submersible propulsion units has a smaller speed output than the one of the first and second motors of the first and second submersible propulsion units.

17. An aquatic jet propulsion device comprising:
a portable main control module including a main controller and a main two-way communication device;
a first submersible propulsion unit including a first motor, a first battery electrically connected to the first motor and a first motor controller operatively connected to the first motor to control a speed of the first motor;
a first sub-two-way communication device configured to communicate with the main two-way communication device;
a second submersible propulsion unit including a second motor, a second battery electrically connected to the second motor and a second motor controller operatively connected to the second motor to control a speed of the second motor; and
a second sub-two-way communication device configured to communicate with the main two-way communication device,
the main controller being programmed to output a first control signal to control the speed of the first motor of the first submersible propulsion unit via the first motor controller based on a first feedback signal containing first propulsion unit data that is received from the first sub-two-way communication device,
the main controller being programmed to output a second control signal to control the speed of the second motor of the second submersible propulsion unit via the second motor controller based on a second feedback signal containing second propulsion unit data that is received from the second sub-two-way communication device,
the main controller being programmed to independently control the speeds of the first and second motors of the first and second submersible propulsion units,
the main controller being programmed to adjust the speed of one of the first and second motors of the first and second submersible propulsion units based on the other of the first and second motors of the first and second submersible propulsion units upon determining the other of the first and second motors of the first and second submersible propulsion units has a smaller battery capacity than the one of the first and second motors of the first and second submersible propulsion units.

18. An aquatic jet propulsion device comprising:
a portable main control module including a main controller and a main two-way communication device;
a first submersible propulsion unit including a first motor, a first battery electrically connected to the first motor and a first motor controller operatively connected to the first motor to control a speed of the first motor;
a first sub-two-way communication device configured to communicate with the main two-way communication device;
a second submersible propulsion unit including a second motor, a second battery electrically connected to the second motor and a second motor controller operatively connected to the second motor to control a speed of the second motor; and
a second sub-two-way communication device configured to communicate with the main two-way communication device,
the main controller being programmed to output a first control signal to control the speed of the first motor of the first submersible propulsion unit via the first motor controller based on a first feedback signal containing first propulsion unit data that is received from the first sub-two-way communication device,
the main controller being programmed to output a second control signal to control the speed of the second motor of the second submersible propulsion unit via the second motor controller based on a second feedback signal containing second propulsion unit data that is received from the second sub-two-way communication device, and
the main controller being programmed to make a turn by reversing thrust of one of the first and second motors of the first and second submersible propulsion units while maintaining thrust of the other of the first and second motors of the first and second submersible propulsion units in a forward direction.

19. The aquatic jet propulsion device according to claim 18, wherein
the main controller is programmed to reverse the thrust of the one of the first and second motors of the first and second submersible propulsion units that is determined to have a smaller speed output.

20. The aquatic jet propulsion device according to claim 19, wherein
the main controller is programmed to reverse the thrust of the one of the first and second motors of the first and second submersible propulsion units that is determined to have a smaller battery capacity.

* * * * *